United States Patent
Kitai et al.

(10) Patent No.: US 9,563,296 B2
(45) Date of Patent: Feb. 7, 2017

(54) DATA PROCESSING DEVICE AND METHOD

(71) Applicant: FUJITSU LIMITED, Kawasaki-shi, Kanagawa (JP)

(72) Inventors: Hiroki Kitai, Kawasaki (JP); Asuka Ishikawa, Inagi (JP); Masatoshi Tsubouchi, Kawasaki (JP); Makoto Uchishima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 14/225,627

(22) Filed: Mar. 26, 2014

(65) Prior Publication Data

US 2014/0292693 A1    Oct. 2, 2014

(30) Foreign Application Priority Data

Mar. 27, 2013    (JP) .................... 2013-067152

(51) Int. Cl.
G06F 3/041    (2006.01)
G06F 21/36    (2013.01)

(52) U.S. Cl.
CPC ............ *G06F 3/041* (2013.01); *G06F 21/36* (2013.01)

(58) Field of Classification Search
USPC .................. 345/156–178; 178/18.01–20.01
See application file for complete search history.

(56) References Cited

U.S. PATENT DOCUMENTS

| | | |
|---|---|---|
| 2005/0208993 A1 | 9/2005 | Yoshizawa et al. |
| 2010/0289764 A1 | 11/2010 | Akabe et al. |
| 2013/0088457 A1* | 4/2013 | Tu .................. G06F 3/04886 345/174 |
| 2013/0100067 A1* | 4/2013 | Dews ................. G06F 3/044 345/174 |
| 2013/0234971 A1 | 9/2013 | Li |
| 2014/0137049 A1* | 5/2014 | Jung ................. H04W 12/06 715/847 |

FOREIGN PATENT DOCUMENTS

| | | |
|---|---|---|
| CN | 101853130 | 10/2010 |
| CN | 101943993 | 1/2011 |

(Continued)

OTHER PUBLICATIONS

JPOA—Office Action of Japanese Patent Application No. 2013-067152 dated Oct. 25, 2016, with partial English translation.

(Continued)

*Primary Examiner* — Chad Dicke
(74) *Attorney, Agent, or Firm* — Fujitsu Patent Center

(57) ABSTRACT

A data processing device includes a processor that executes a procedure. The procedure includes: (a) detecting a contact operation to a contacted face and receiving an instruction, (b) in a locked state, executing first determination to determine whether or not the contact operation detected at (a) is a pre-registered first contact operation, and executing second determination to determine whether or not a second contact operation to a different region from the region where the first contact operation has been detected has been performed, and (c) releasing the locked state when it is determined at (b) that the first contact operation and the second contact operation have been detected at (a).

21 Claims, 18 Drawing Sheets

(56) References Cited

FOREIGN PATENT DOCUMENTS

| JP | 07-93073 | 4/1995 |
| JP | 10-177457 | 6/1998 |
| JP | 2002-082734 | 3/2002 |
| JP | 2005-253686 | 9/2005 |
| JP | 2006-146660 | 6/2006 |
| JP | 2007-148658 | 6/2007 |
| JP | 2008-204409 | 9/2008 |
| JP | 2010-266997 | 11/2010 |
| JP | 2011-150672 | 8/2011 |
| WO | 2012/055348 A1 | 5/2012 |

OTHER PUBLICATIONS

CNOA—Office Action of Chinese Patent Application No. 201410119642.3 dated Nov. 3, 2016, with full English translation of the Office Action.

\* cited by examiner

[LOCK RELEASE SCREEN]

[LOCK RELEASE SCREEN]

[LOCK RELEASE SCREEN]

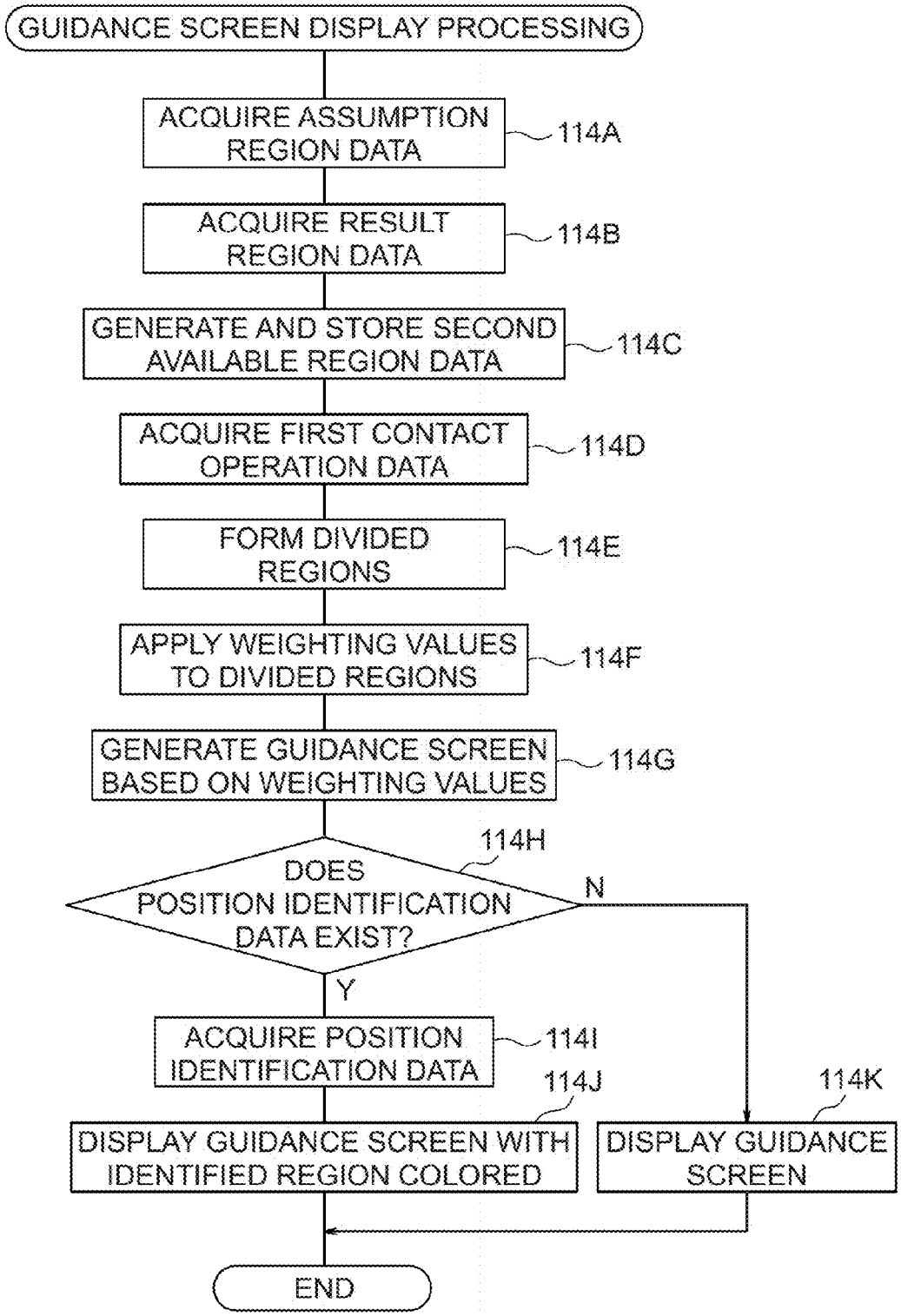

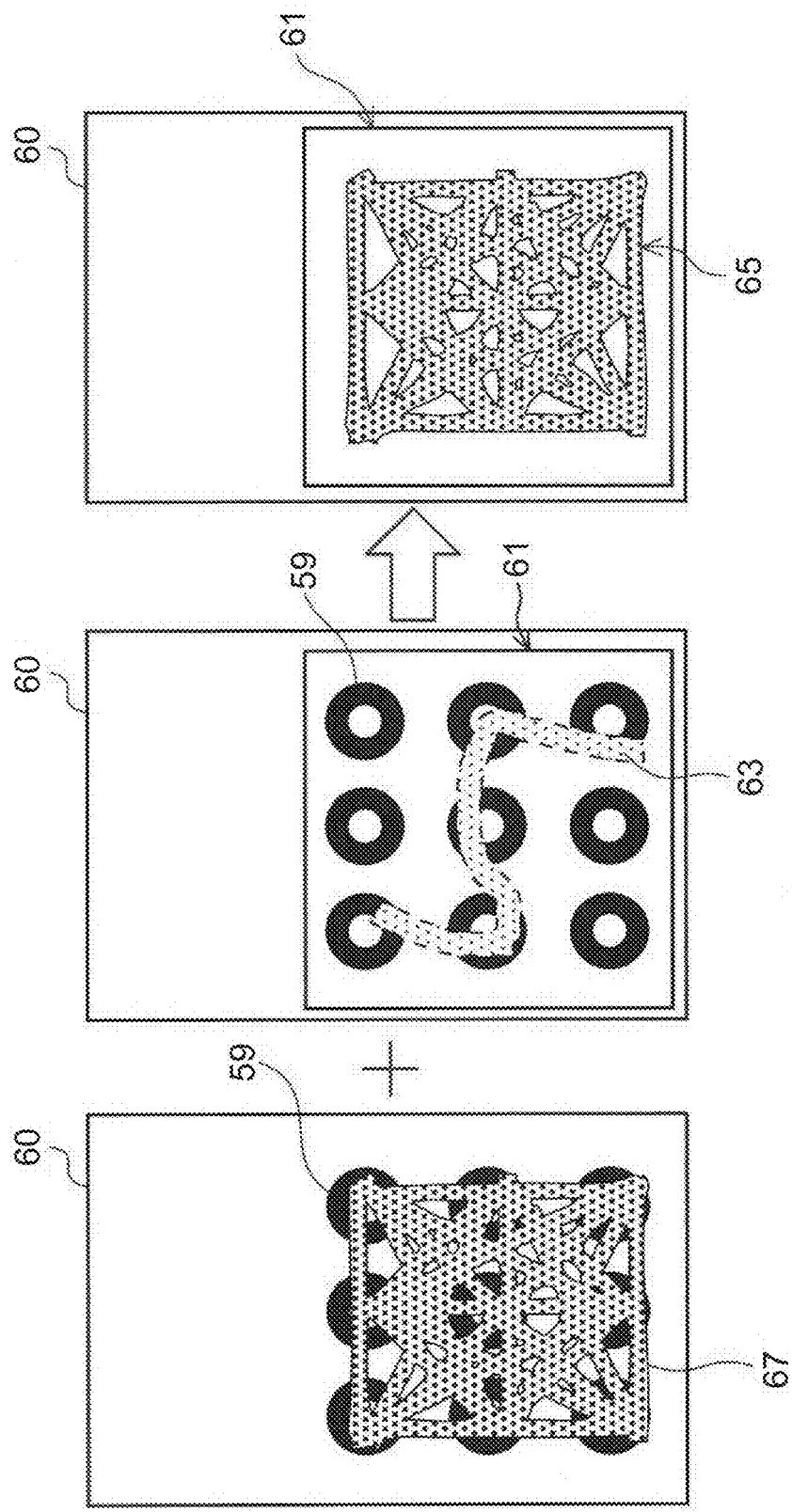

REGION COLORED YELLOW

[LOCK RELEASE SCREEN]   [GUIDANCE SCREEN]

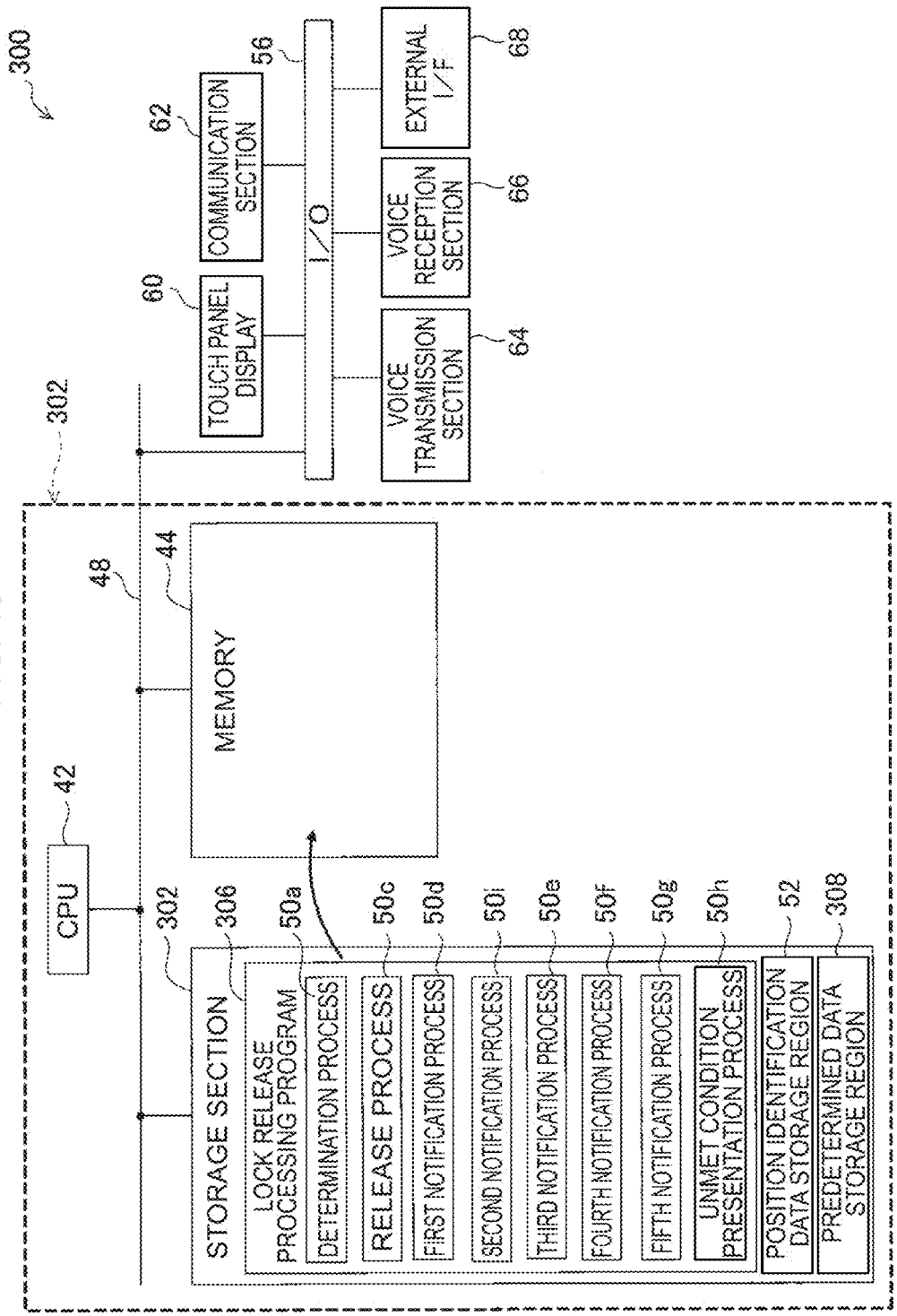

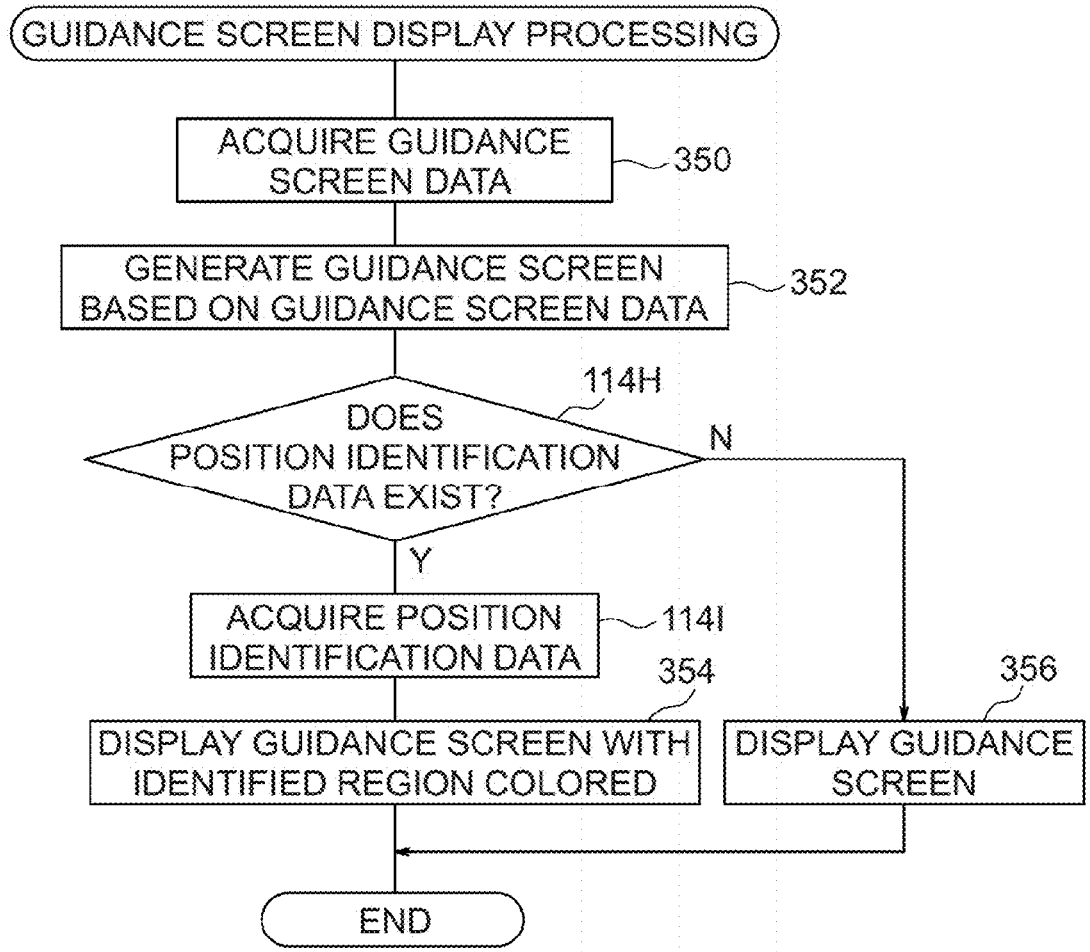

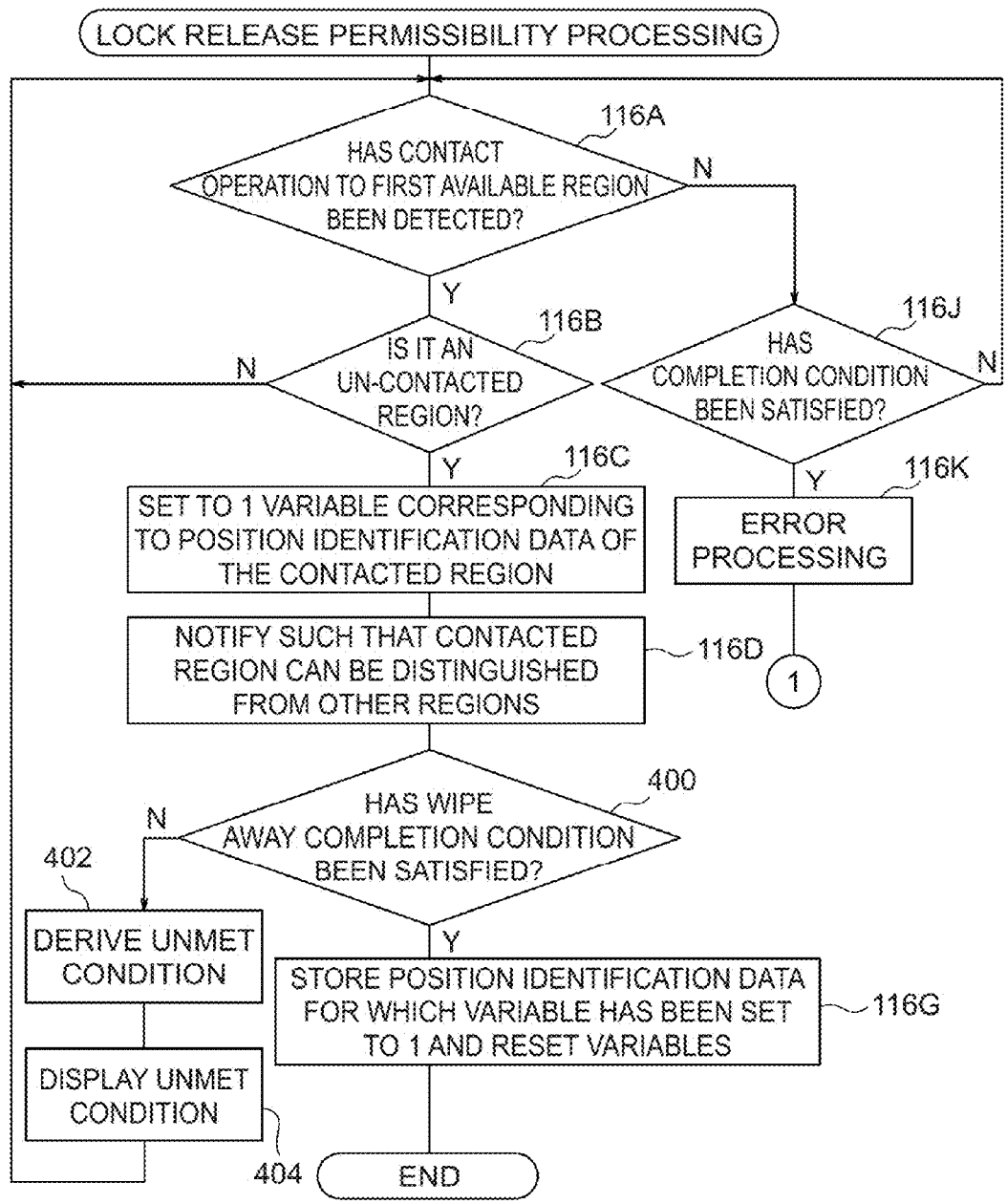

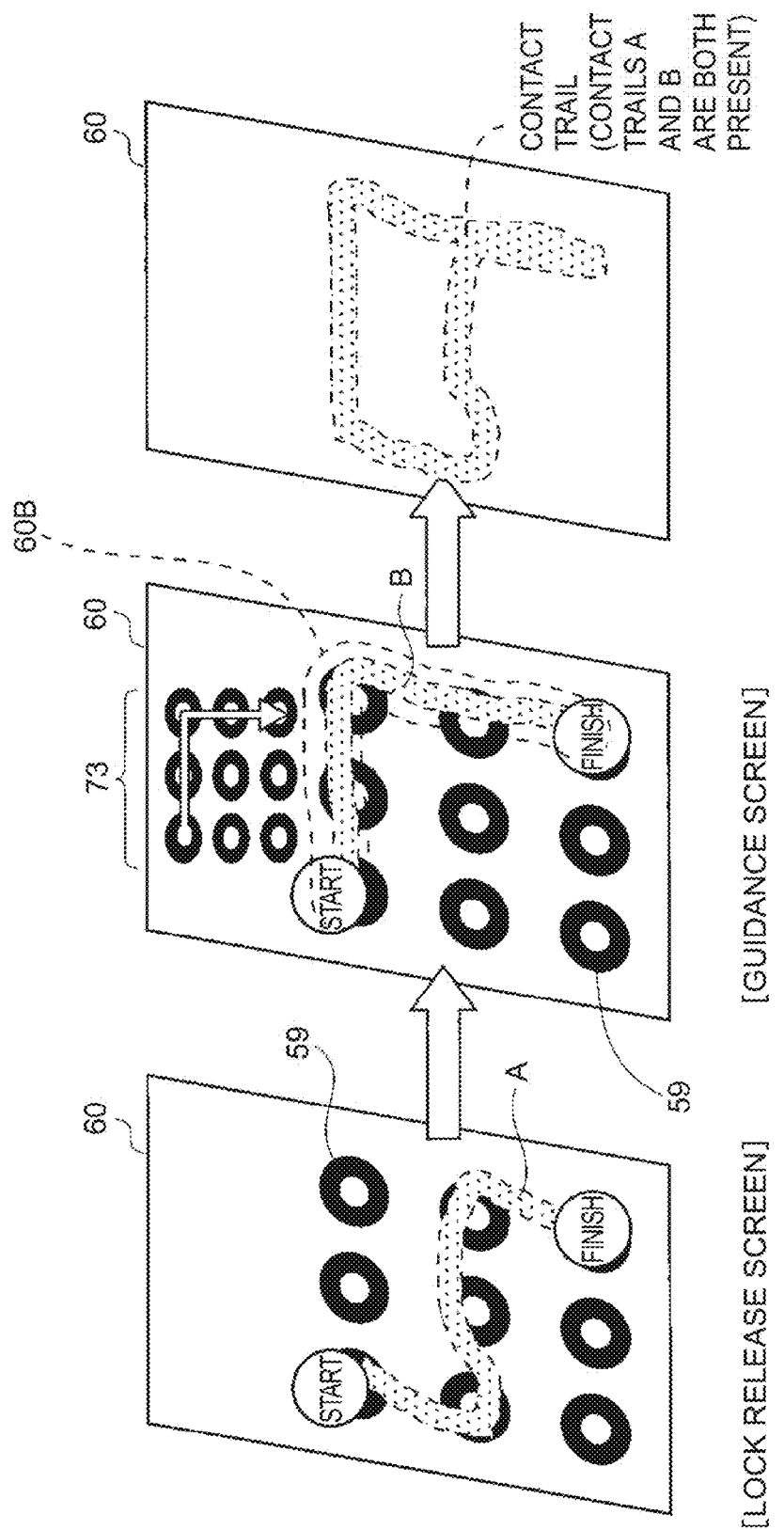

DATA PROCESSING DEVICE AND METHOD

CROSS-REFERENCE TO RELATED APPLICATION

This application is based upon and claims the benefit of priority of the prior Japanese Patent Application No. 2013-067152, filed on Mar. 27, 2013, the entire contents of which are incorporated herein by reference.

FIELD

The embodiments discussed herein are related to a data processing device and method.

BACKGROUND

Many data processing devices such as smartphones and personal computers are installed with a lock function that is a function for example to prevent third party use of the data processing device.

Many data processing devices that include a touch panel enter a standby state (locked state) awaiting a specific contact operation when the lock function is active, with the locked state not being released unless the specific contact operation is performed to the data processing device. The specific contact operation may be for example an operation to depict a specific graphic on the touch panel. In such a configuration, the locked state is released when a graphic depicted on the touch panel matches a pre-registered graphic to within a specific margin of error.

RELATED PATENT DOCUMENTS

Japanese Patent Application Laid-Open (JP-A) No. 2002-82734
JP-A No. 2005-253686

SUMMARY

According to an aspect of the embodiments, a data processing device includes: a processor; and a memory storing instructions, which when executed by the processor perform a procedure, the procedure including: (a) detecting a contact operation to a contacted face and receiving an instruction, (b) in a locked state, executing first determination to determine whether or not the contact operation detected at (a) is a pre-registered first contact operation, and executing second determination to determine whether or not a second contact operation to a different region from the region where the first contact operation has been detected has been performed, and (c) releasing the locked state when it is determined at (b) that the first contact operation and the second contact operation have been detected at (a).

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a flow chart illustrating an example of a flow of processing of guidance screen display processing according to the first exemplary embodiment;

FIG. 9 is a diagram illustrating an example of a state of a second available region according to the first exemplary embodiment;

FIG. 19 is a block diagram illustrating an example of a configuration of an electrical system of a smartphone according to the second exemplary embodiment;

FIG. 20 is a flow chart illustrating an example of a flow of guidance screen display processing according to the second exemplary embodiment;

FIG. 21 is a flow chart illustrating an example of a flow of lock release permissibility processing according to the second exemplary embodiment; and FIG. 22 is a diagram illustrating examples of respective states of the surface of a touch panel display in a state in which a lock release screen, a guidance screen, and contact trails of a first contact operation and a second contact operation are present together in the second exemplary embodiment.

DESCRIPTION OF EMBODIMENTS

Detailed explanation follows regarding an example of technology disclosed herein, with reference to the drawings. Note that in the following description, explanation is given regarding a multifunction portable telephone, known as a smartphone, as an example of an information processing device, however there is no limitation of the technology disclosed herein thereto. For example, the technology disclosed herein may be applied to various information processing devices such as portable personal computers, Personal Digital Assistants (PDAs), desktop personal computers, and Automated Teller Machines (ATMs).

First Exemplary Embodiment

Figure 1:
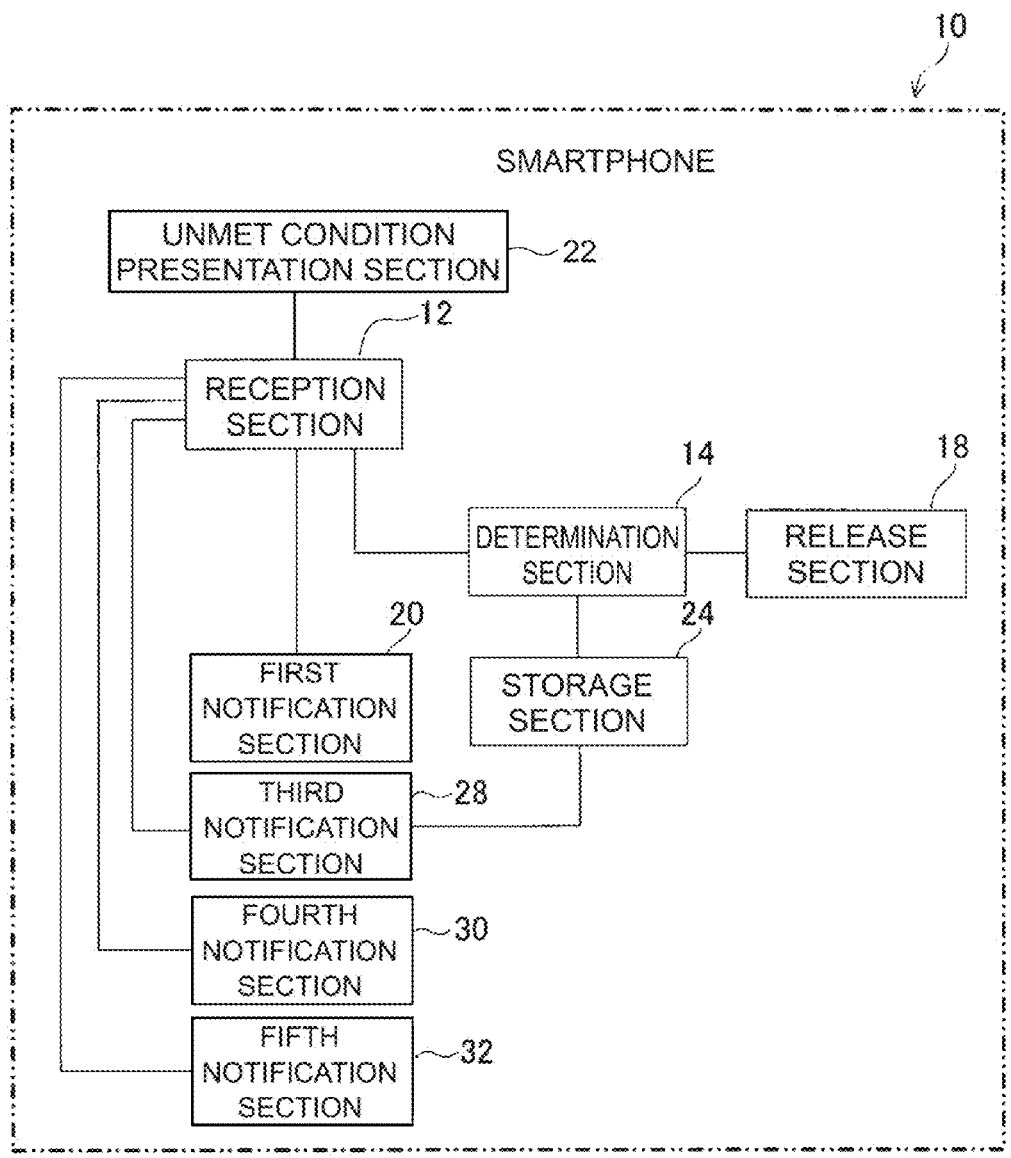
FIG. 1 is a function block diagram illustrating an example of main functions of a smartphone according to a first exemplary embodiment.

FIG. 1 illustrates an example of main functions of a smartphone 10 of a first exemplary embodiment. The smartphone 10 includes a telephone call function, an e-mail function and a lock function. The telephone call function is a function to perform voice transmission and voice reception with a designated party over public lines, and is a function included in general telephones. The e-mail function is a function to compose e-mails and perform transmission and reception of e-mails. The lock function is a function to prevent use of the smartphone 10 by a third party.

The smartphone 10 includes a reception section 12, a determination section 14, and a release section 18. The reception section 12 detects a contact operation to a contacted face and receives instructions. The "contacted face" refers to, for example, the surface of a touch panel display that is provided to the smartphone 10. The determination section 14 executes first determination to determine whether or not a contact operation detected by the reception section 12 in a locked state (a state in which use of the smartphone 10 is locked by the lock function) is a pre-registered first contact operation. The determination section 14 also executes second determination to determine whether or not a second contact operation has been performed to a different region from the region where the first contact operation has been detected. The second contact operation means a contact operation that forms a contact trail in a second region that is different from a first region where the first contact operation was performed. The release section 18 releases a locked state when determination is made by the determination section 14 that the first contact operation and the second contact operation have been performed.

The smartphone 10 also includes a first notification section 20, an unmet condition presentation section 22, a storage section 24, a third notification section 28, a fourth notification section 30 and a fifth notification section 32.

The first notification section 20 notifies to distinguish between divided regions that have been applied with a weighting value of a specific size or above and another divided regions. The divided regions refer to individual regions obtained by dividing an available region that is a region determined in advance to be region that might receive contact accompanying the first contact operation to the contacted face.

The unmet condition presentation section 22 identifies a condition that is required in order for the determination section 14 to make determination that the second contact operation has been performed that is unmet at the current point in time (referred to below as an "unmet condition") while the second contact operation is being performed, and presents the identified unmet condition tracked against the formation of the contact trail.

The storage section 24 stores position identification data that identifies a position of the contact trail formed by the second contact operation. In a state in which position identification data has been stored in the storage section 24 in the past, the third notification section 28 notifies to distinguish between positions on the contact trail and other positions on the contacted face that are not on the contact trail when the determination section 14 has determined that a contact operation detected by the reception section 12 is a first contact operation. Namely, the third notification section 28 notifies to distinguish between a contact trail position identified by the position identification data stored in the storage section 24 and other positions on the contacted face that are not on the contact trail.

The fourth notification section 30 notifies to distinguish between contact trail positions and positions on the contacted face that are not on the contact trail, and changes the notification tracked against the contact trail formation accompanying the contact trail that is being formed on the contacted face.

The fifth notification section 32 notifies to distinguish between plural respective pre-instructed candidate positions that are candidate positions on the contacted face to perform the first contact operation, and other positions on the contacted face. "Plural candidate positions" refer to, for example, plural positions respectively enclosed by plural frames (for example circular frames) disposed in a pattern of rows and columns on the surface of the touch panel display that is provided to the smartphone 10. The determination section 14 determines whether or not a first contact operation is a first contact operation connecting plural designated candidate positions out of the plural candidate positions notified by the fifth notification section 32 along a first contact operation path (for example a pre-registered path). "Plural designated candidate positions" refers for example to plural positions on the surface of the touch panel display provided to the smartphone 10 that are enclosed by plural designated frames out of the plural frames mentioned above.

Figure 2:
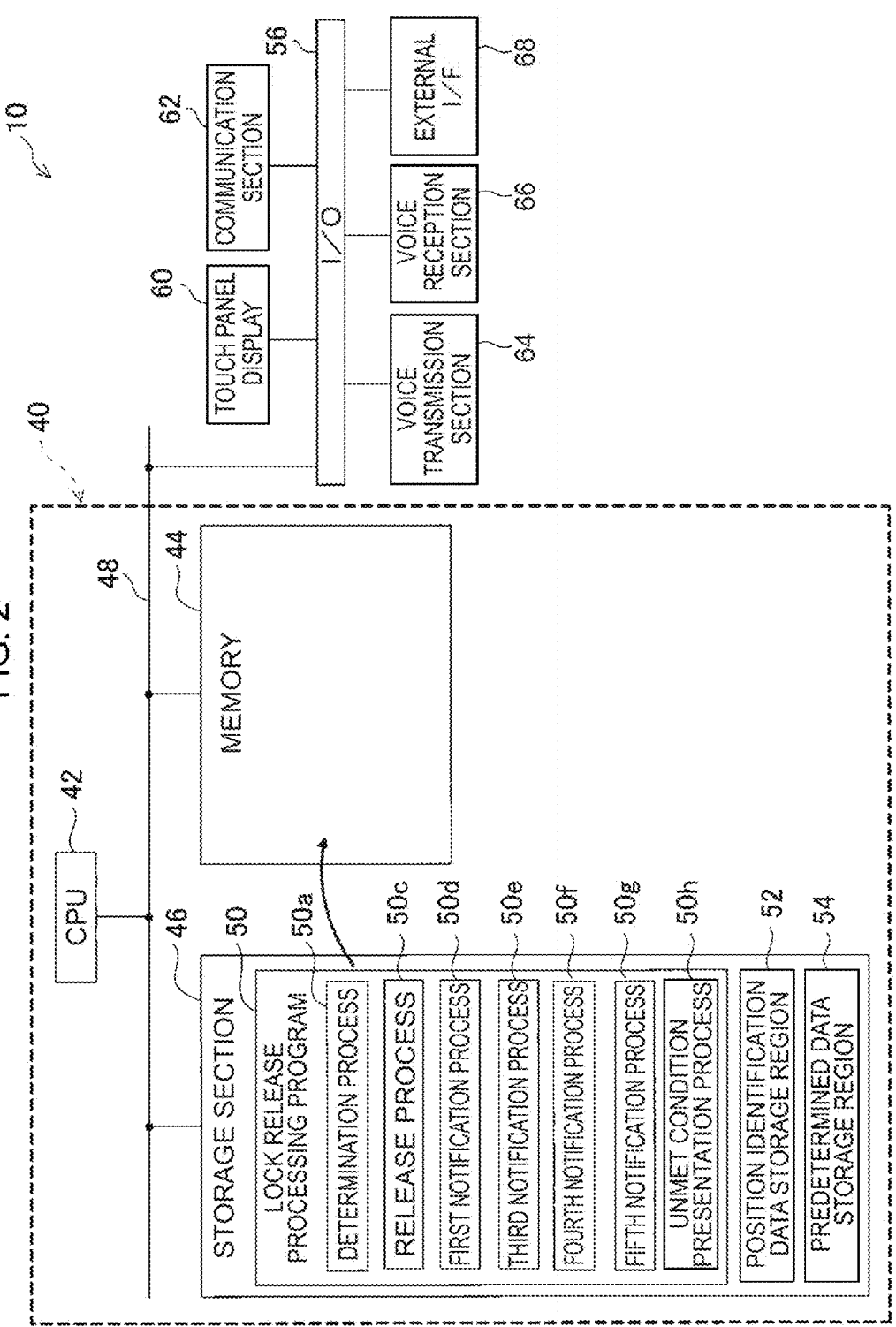
FIG. 2 is a block diagram illustrating an example of a configuration of an electrical system of a smartphone according to the first exemplary embodiment.

FIG. 2 illustrates an example of a configuration of main portions of an electrical system of the smartphone 10. As illustrated in FIG. 2, the smartphone 10 includes a computer 40 and various input and output devices. The reception section 12, the determination section 14, the release section 18, the first notification section 20, the unmet condition presentation section 22, the storage section 24, the third notification section 28, the fourth notification section 30 and the fifth notification section 32 may for example be implemented by the computer 40 and the various input and output devices.

The computer 40 includes a Central Processing Unit (CPU) 42, memory 44, and a non-volatile storage section 46. The CPU 42, the memory 44 and the storage section 46 are mutually connected together through a bus 48. Note that the storage section 46 may be implemented by for example a Hard Disk Drive (HDD) or by flash memory.

The smartphone 10 includes an input/output interface (I/O) 56 that is electrically connected to the computer 40 and the various input and output devices, and that controls the transmission and reception of various data between the computer 40 and the various input and output devices. The smartphone 10 is provided with a touch panel display 60 as an example of the reception section 12 illustrated in FIG. 1, the touch panel display 60 serving as an input and output device that is electrically connected to the computer 40 through the bus 48 due to being connected to the I/O 56.

The touch panel display 60 is configured by superimposing a transparent type touch panel and a display (for example a liquid crystal display) on each other, and performs detecting of contact operations by a user of the smartphone 10 at the touch panel to receive instructions, as well as displaying of various information on the liquid crystal display.

A lock release processing program 50 is stored in the storage section 46. The CPU 42 reads the lock release processing program 50 from the storage section 46 and expands it into the memory 44, and sequentially executes the process of the lock release processing program 50. The lock release processing program 50 includes a determination process 50a and a release process 50c. The CPU 42 operates as the determination section 14 illustrated in FIG. 1 by executing the determination process 50a. The CPU 42 operates as the release section 18 illustrated in FIG. 1 by executing the release process 50c.

The lock release processing program 50 further includes a first notification process 50d, a third notification process 50e, a fourth notification process 50f, a fifth notification process 50g and an unmet condition presentation process 50h. The CPU 42 operates as the first notification section 20 illustrated in FIG. 1 by executing the first notification process 50d. The CPU 42 operates as the third notification section 28 illustrated in FIG. 1 by executing the third notification process 50e. The CPU 42 operates as the fourth notification section 30 illustrated in FIG. 1 by executing the fourth notification process 50f. The CPU 42 operates as the fifth notification section 32 illustrated in FIG. 1 by executing the fifth notification process 50g. The CPU 42 moreover operates as the unmet condition presentation section 22 illustrated in FIG. 1 by executing the unmet condition presentation process 50h.

The storage section 46 includes a position identification data storage region 52 and a default data storage region 54. The position identification data is stored in the position identification data storage region 52. The "position identification data" here refers to, for example, 2-dimensional coordinates enabling identification of a position on the surface of the touch panel display 60 of the contact trail formed by the second contact operation to the surface of the touch panel display 60. Note that the "2-dimensional coordinates" employed in the first exemplary embodiment refer to, for example, 2-dimensional coordinates whose origin is a pre-allocated designated point on the surface of the touch panel display 60 (for example a point on the lower left of the touch panel display 60).

Figure 4:
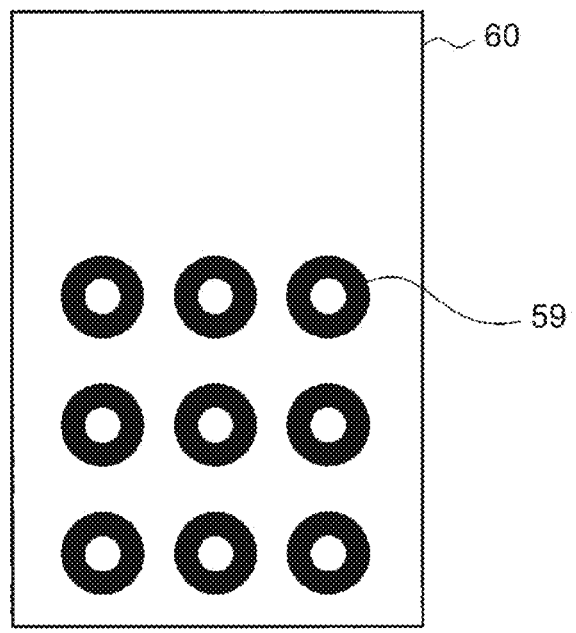
FIG. 4 is a diagram illustrating an example of a state of a lock release screen according to the first exemplary embodiment.

Pattern lock image data indicating plural pattern lock images 59, an example of which is illustrated in FIG. 4, is pre-stored in the default data storage region 54. The pattern lock image data for example expresses an image wherein the pattern lock images 59 are respectively disposed at the plural candidate positions on the touch panel display 60.

Further, anticipated region data is pre-stored in the default data storage region 54. "Anticipated region data" refers to, for example, an array of 2-dimensional coordinates enabling identification of a region (referred to below as an "anticipated region") 67, an example of which is illustrated in FIG. 9, that is anticipated in advance to be a region that might receive contact accompanying the first contact operation to the surface of the touch panel display 60.

Furthermore, first contact operation data expressing a route of the first contact operation is pre-stored in the default data storage region 54. "First contact operation data" refers to, for example, an array of 2-dimensional coordinates enabling identification of the position of a region on the surface of the touch panel display 60 that receives contact according to the pre-registered first contact operation.

Note that an example is described of a case in which the lock release processing program 50 is read from the storage section 46, however the lock release processing program 50 does not initially have to be stored in the storage section 46. For example, configuration may be made wherein the lock release processing program 50 is first stored in an appropriate "portable storage medium" that is employed connected to the computer 40, such as a Solid State Drive (SSD), a DVD disk, an IC card, a magneto-optical disk, or a CD-ROM. Configuration may then be made wherein the computer 40 acquires the lock release processing program 50 from the portable storage medium and executes the lock release processing program 50. Configuration may also be made wherein the lock release processing program 50 is stored on another computer or a server device to which the computer 40 is connected through a communication line, from which with the computer 40 acquires and executes the lock release processing program 50.

The smartphone 10 is connected to a communication section 62, a voice transmission section 64, a voice reception section 66 and an external interface (I/F) 68 that serve as input and output devices connected to the I/O 56.

The communication section 62 controls transmission and reception of various data between a data processing device (not illustrated in the drawings) that is connected to a wireless communication network and the computer 40 by performing wireless communication with the nearest base station of the wireless communication network. The communication section 62 includes for example an antenna (not illustrated in the drawings) and a Radio Frequency (RF) circuit (not illustrated in the drawings). When thus configured, the communication section 62 for example receives with the antenna signals that are wirelessly transmitted from the external data processing device via the base station, performs demodulation processing on the received signal in the RF circuit, and supplies data containing the received signal to the computer 40. The communication section 62 also performs modulation processing on data supplied from the computer 40 and transmits the data through the antenna to an external data processing device via the base station.

The voice transmission section 64 detects a voice generated by a user of the smartphone 10 during a phone call and outputs voice signals expressing the detected voice to the computer 40. The voice transmission section 64 includes for example a microphone (not illustrated in the drawings) and a signal processing circuit (not illustrated in the drawings). When thus configured, the microphone detects the voice, and the voice detected by the microphone is converted into voice data in the signal processing circuit and output to the communication section 64 via the computer 40. Note that an example is given of a configuration wherein the voice data is output to the communication section 62 via the computer 40, however the voice data may be directly output from the signal processing section included in the voice transmission section 64 to the communication section 62.

The voice reception section 66 outputs a voice expressed by voice data received by the communication section 62. The voice reception section 66 includes for example a digital to analogue (D/A) conversion circuit (not illustrated in the drawings), an amplifier (not illustrated in the drawings), and a speaker (not illustrated in the drawings). When thus configured, for example the D/A conversion circuit performs D/A conversion on voice data supplied from the computer 40, and after D/A conversion, a voice signal amplified by the amplifier is output to the speaker. The speaker externally outputs a voice according to the voice signal input from the amplifier. Note that an example is given of a configuration wherein the voice data received by the communication section 62 is supplied to the voice reception section 66 via the computer 40, however the voice data received by the communication section 62 may be directly supplied to the voice reception section 66 without passing via the computer 40.

The external I/F 68 connects to an external device (for example a personal computer or to USB memory), and controls the transmission and reception of various data between the external device and the computer 40.

Figure 3:
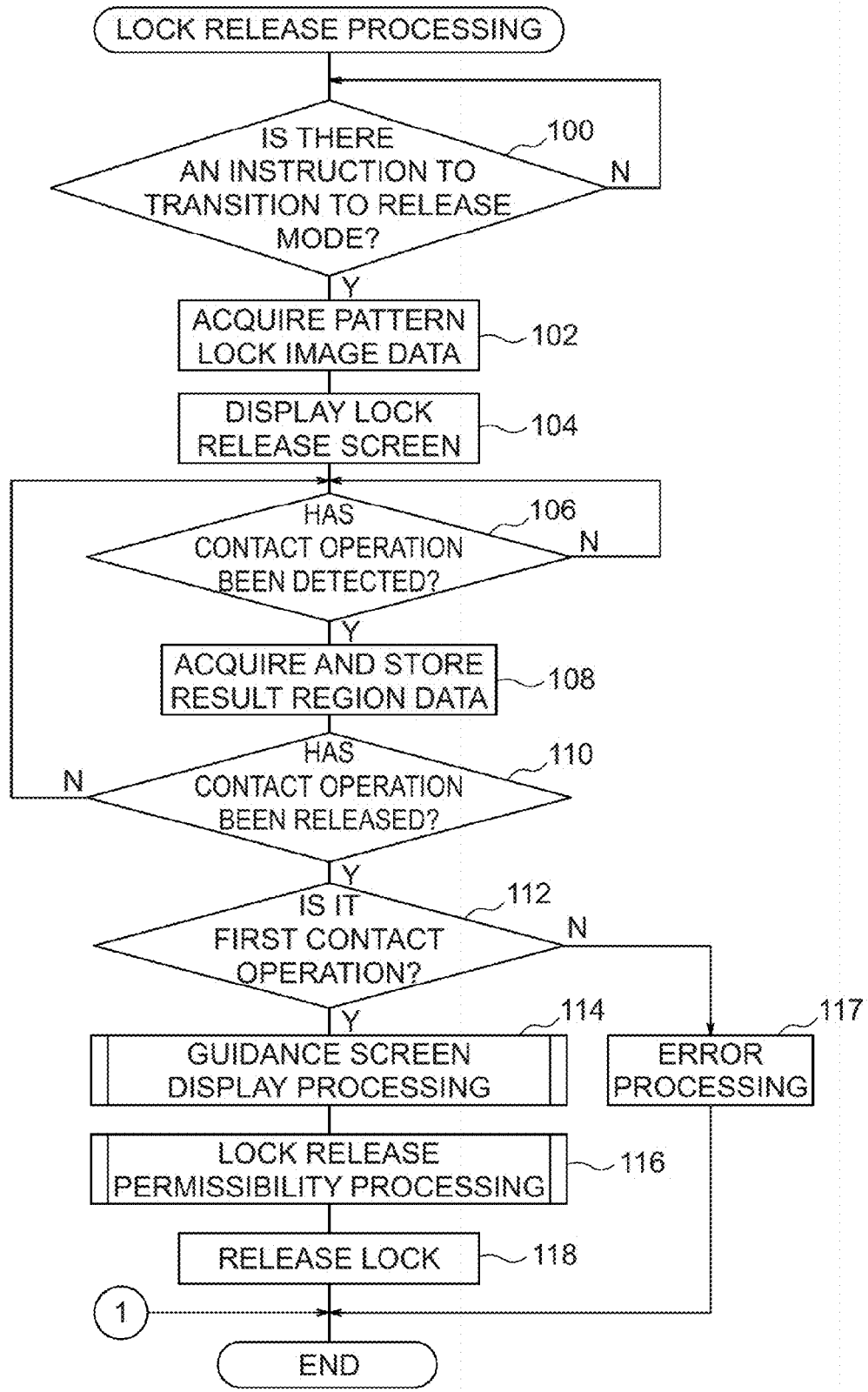
FIG. 3 is a flow chart illustrating an example of a flow of lock release processing according to the first exemplary embodiment and a second exemplary embodiment.

Next, explanation follows with reference to FIG. 3 regarding lock release processing performed by the CPU 42 executing the lock release processing program 50 in a locked state of the smartphone 10, as operation of the first exemplary embodiment. Note that for ease of explanation, explanation is given regarding a case in which a standby screen is being displayed on the touch panel display 60.

In the lock release processing illustrated in FIG. 3, firstly at step 100 the fifth notification section 32 determines whether or not an instruction for transition from the standby screen to a lock release screen (a transition to release mode instruction) has been received by the touch panel display 60. The "lock release screen" means a screen that guides operation to release the locked state of the smartphone 10. When at step 100 a transition to release mode instruction has been received by the reception section 12, determination is affirmative and processing transitions to step 102. When at step 100 a transition to release mode instruction has not been received by the reception section 12, determination is negative and the processing of step 100 is performed again.

At step 102, the fifth notification section 32 acquires the pattern lock image data from the default data storage region 54, after which processing transitions to step 104. At step 104 the fifth notification section 32 displays the lock release screen on the touch panel display 60. FIG. 4 illustrates an example of the lock release screen. The plural pattern lock images 59 expressed by the pattern lock image data acquired at step 102 are displayed on the lock release screen, an example of which is illustrated in FIG. 4. FIG. 4 illustrates an example of a configuration in which the pattern lock images 59 are disposed in a pattern of 3×3 rows and columns, and each of the pattern lock images 59 is a circular frame shaped image. Note that although the present example illustrates a configuration in which the pattern lock images 59 are disposed in a pattern of 3×3 rows and columns, the technology disclosed herein is not limited thereto. For example, configuration may be made with the plural pattern lock images 59 disposed in a pattern of rows and columns in which the number of rows and the number of columns are different from each other. Moreover, the plural pattern lock images 59 do not have to be disposed in a pattern of rows and columns, and may for example be disposed with another placement pattern, such as in an L-shape or in an S-shape.

Figure 5:
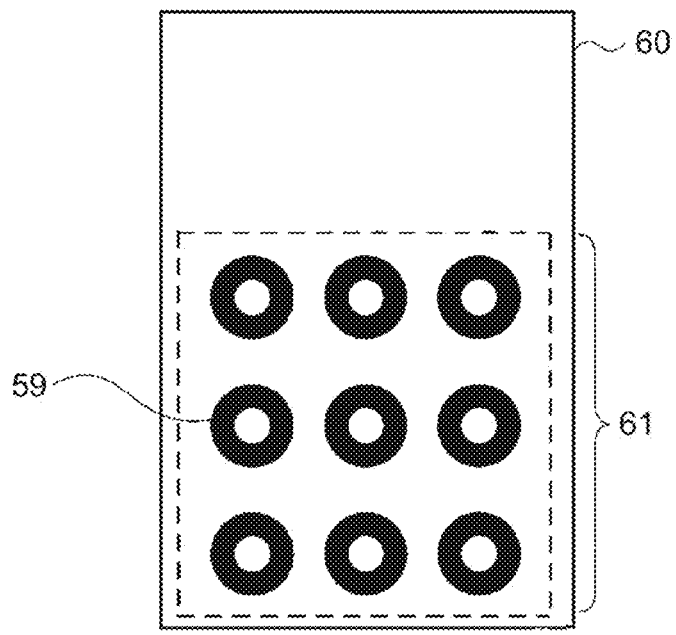
FIG. 5 is a diagram illustrating an example of a state of a first available region according to the first exemplary embodiment.

At the next step 106, the determination section 14 determines whether or not a fresh contact operation has been detected to a first available region 61, of which an example is illustrated in FIG. 5, of the touch panel display 60. The first available region 61 is a region that is determined in advance to be a region that might receive contact accompanying the first contact operation to the touch panel display 60. In the example illustrated in FIG. 5, the first available region 61 is configured by the region enclosed by the rectangular dotted line frame containing the plural pattern lock images 59. Note that in the example illustrated in FIG. 5, the rectangular dotted line frame is shown for ease of explanation, however in reality a line image such as the rectangular dotted line frame may or may not be displayed to indicate the boundary between the first available region 61 and regions other than the first available region 61. When at step 106 a fresh contact operation to the touch panel display 60 has been detected, determination is affirmative and processing transitions to step 108. When at step 106 a new contact operation to the touch panel display 60 has not been detected determination is negative and the determination of step 106 is performed again.

Figure 6:
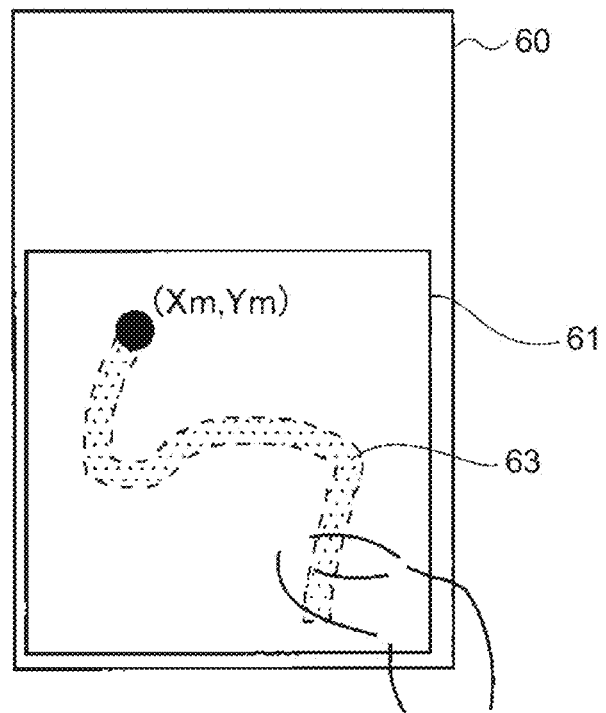
FIG. 6 is a diagram illustrating an example of a state of a actual result region according to the first exemplary embodiment.

At step 108 the determination section 14 acquires actual result region data and stores the actual result region data in the memory 44, after which processing transitions to step 110. "Actual result region data" refers to data that indicates a region (referred to below as the "result region") 63 of the surface of the touch panel display provided to the smartphone 10 that has received contact accompanying the first contact operation, an example of which is illustrated in FIG. 6. Note that the result region 63 is an example of the first region of the technology disclosed herein. In the first exemplary embodiment, an array of 2-dimensional coordinates enabling identification of a position on the surface of the touch panel display 60 is employed as an example of the actual result region data. Moreover, in the first exemplary embodiment, the actual result region 63 incorporates a specific peripheral region into the region that has received contact accompanying the first contact operation to the touch panel display 60. As illustrated in FIG. 6, the actual result region 63 is for example a circular shaped region with a radius of a specific length centered on 2-dimensional coordinates (Xm, Ym) that express a central point of the region contacted accompanying the first contact operation to the touch panel display 60. The "specific length" referred to here is for example between 5 mm and 10 mm, and refers to a region in which the region that is actually contacted has been widened by a specific factor. An example is described of a circular shaped region, however there is no limitation thereto, and configuration may be made with a region of another shape, for example a square shaped region or a triangular shaped region.

At the next step 110, the determination section 14 determines whether or not the contact operation to the reception section 12 has been released. When at step 110 the contact operation to the reception section 12 has not been released, determination is negative and processing transitions to step 106. When at step 110 the contact operation to the reception section 12 has been released, determination is affirmative and processing transitions to step 112.

At step 112, the determination section 14 determines whether or not the contact operation detected at step 106 was a first contact operation. At step 112, the determination section 14 for example determines whether or not a difference between the first contact operation data stored in the default data storage region 54 matches the actual result region data stored in the memory 44 at the current point in time to within a specific margin of error. Namely, for example determination is made as to whether or not both the shape and surface area of the contact trail (route) of the first contact operation match the shape and surface area of the of the actual result region 63 to within the specific margin of error. When at step 112 the contact operation detected at step 106 was not a first contact operation, determination is negative and processing transitions to step 117. When at step 112 the contact operation detected at step 106 was a first contact operation, determination is affirmative and processing transitions to step 114.

At step 117, the determination section 14 performs error processing, after which the present lock release processing is ended. "Error processing" refers to, for example, processing to display on the touch panel display 60 a message indicating the fact that the contact operation to release the locked state was incorrect and to delete the result region data from the memory 44.

Figure 7:
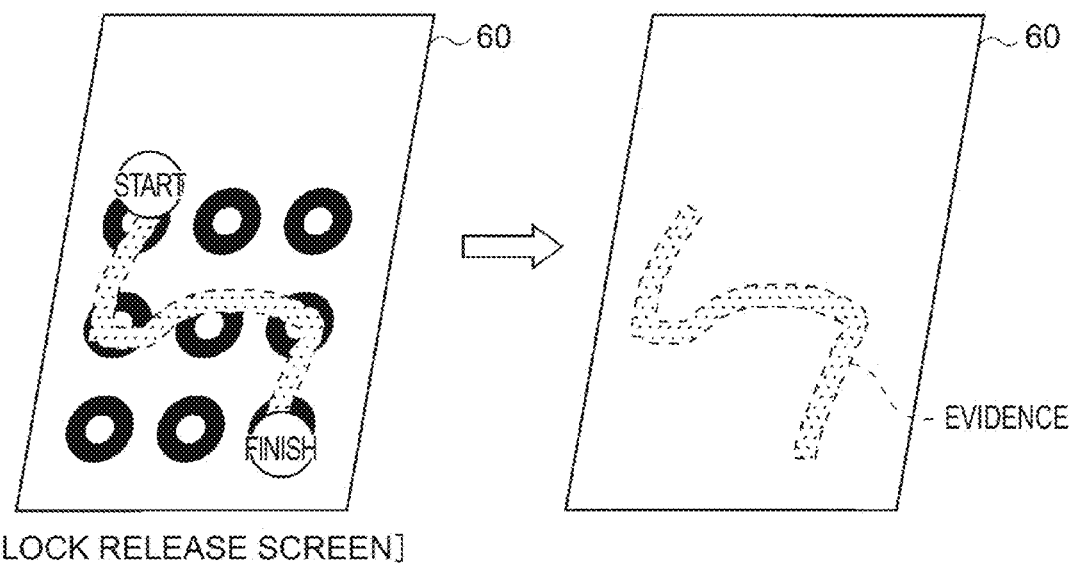
FIG. 7 is a diagram illustrating an example of evidence of contact that is left on the surface of a touch panel display when a first contact operation has been performed according to the first exemplary embodiment.
Figure 13:
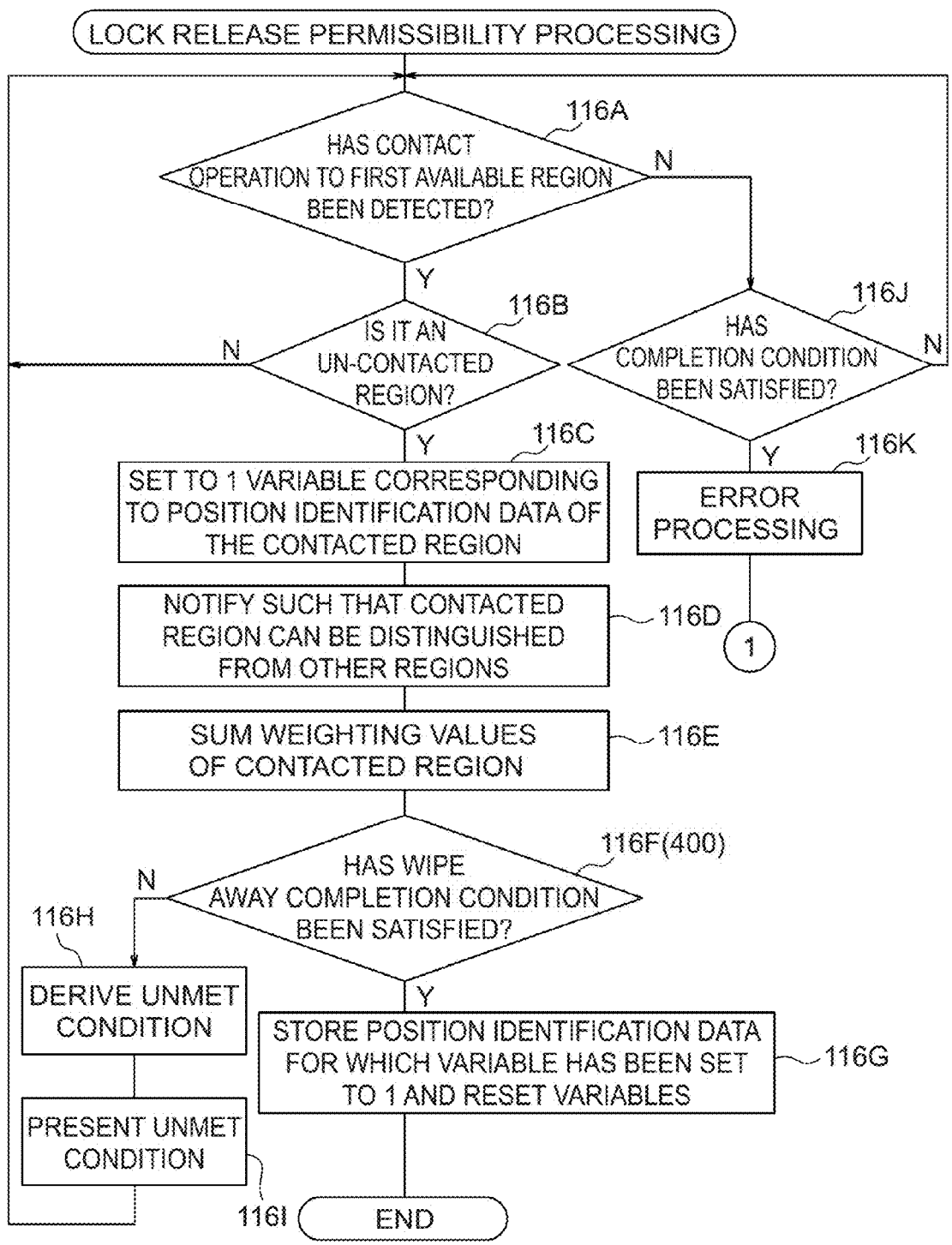
FIG. 13 is a flow chart illustrating an example of a flow of lock release permissibility processing according to the first and second exemplary embodiments.

FIG. 7 illustrates an example of a state of the touch panel display 60 when a contact operation has been performed to release the locked state. As illustrated in FIG. 7, when a finger has been traced across specific plural pattern lock images using the touch panel display 60, the route traced by the finger is left on the surface of the touch panel display 60. There is accordingly a possibility that a third party discerns what kind of operation the first contact operation is from the evidence of contact that is left on the surface of the touch panel display 60. In the present lock release processing, at step 114 the determination section 14 performs guidance screen display processing, of which an example is illustrated in FIG. 8, after which at step 116 the determination section 14 performs lock release permissibility processing, of which an example is illustrated in FIG. 13.

FIG. 8 illustrates an example of a flow of guidance screen display processing. In the guidance screen display processing illustrated in FIG. 8, firstly at step 114A the determination section 14 acquires the anticipated region data from the default data storage region 54. At the next step 114B, the determination section 14 acquires the actual result region data from the memory 44. At the next step 114C, the determination section 14 generates second available region data based on the anticipated region data acquired at step 114A and the actual result region data acquired at step 114B, and stores the second available region data in the memory 44. The "second available region data" refers to, for example, an array of 2-dimensional coordinates enabling identification of a position on the surface of the touch panel display 60 of a region (referred to below as the "second available region") 65, of which an example is illustrated in FIG. 9, that, out of the first available region 61, is available for a second contact operation.

The second available region 65 is a region corresponding to the logical sum of the anticipated region 67 expressed by the anticipated region data acquired at step 114A and the actual result region 63 expressed by the actual result region data acquired at step 114B. FIG. 9 schematically illustrates an example of a method for determining the second available region. In the example illustrated in FIG. 9, plural pre-anticipated paths that might be traced between the plural pattern lock images 59 according to a first contact operation are designated as the anticipated region 67, and the path that is actually traced between the plural pattern lock images according to the first contact operation is designated as the actual result region 63.

Figure 10A:
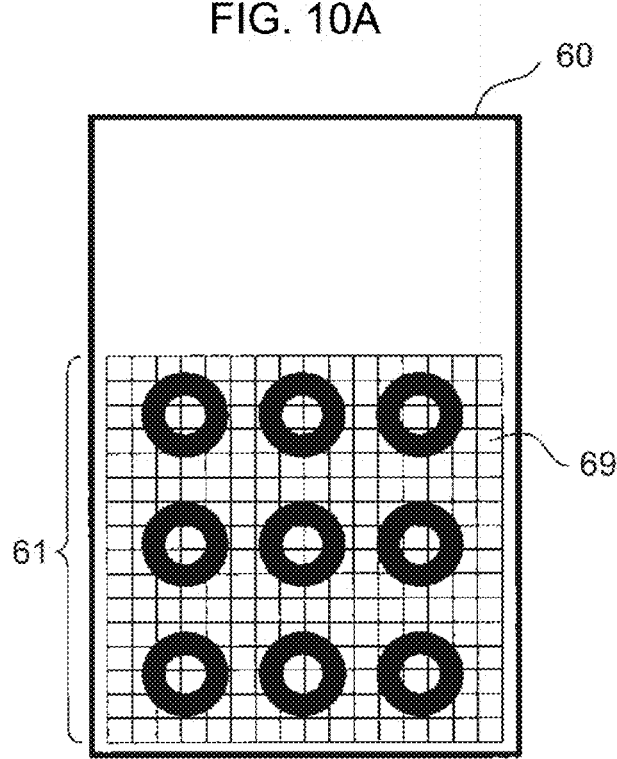
FIG. 10A is a diagram illustrating an example of divided regions according to the first exemplary embodiment.
Figure 10B:
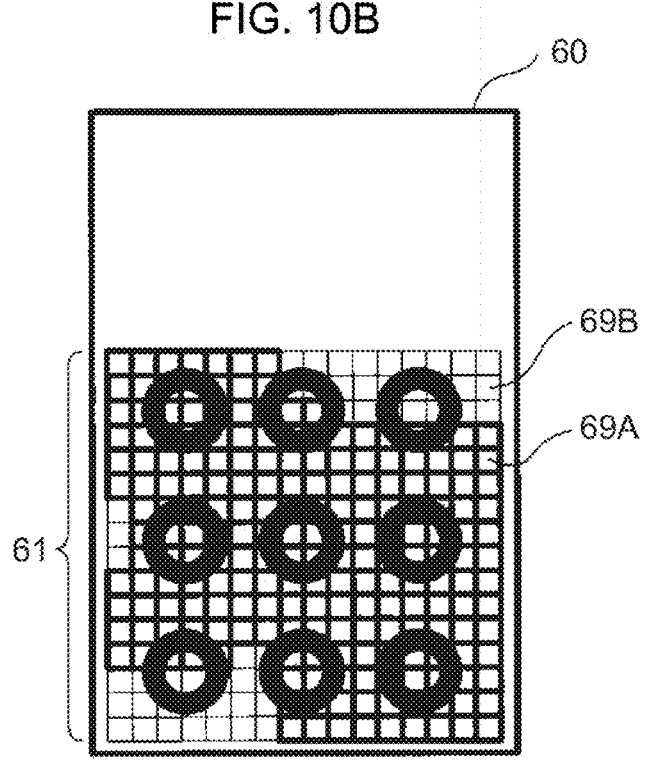
FIG. 10B is a diagram illustrating an example of a state of anticipated divided regions and non-anticipated divided regions according to the first exemplary embodiment.

At the next step 114D, the determination section 14 acquires the first contact operation data from the default data storage region 54, after which processing transitions to step 114E. At step 114E, the determination section 14 generates plural divided regions 69, an example of which is illustrated in FIG. 10A, by dividing the first available region 61. The plural divided regions 69 are arrayed in a lattice pattern, as illustrated in the example in FIG. 10A. The plural divided regions 69 are further roughly split into anticipated divided regions 69A and non-anticipated divided regions 69B, examples of which are illustrated in FIG. 10B. In the example illustrated in FIG. 10B, the divided regions 69 enclosed by the bold lines are the anticipated divided regions 69A, and the divided regions 69 enclosed by the fine lines are the non-anticipated divided regions 69B. Namely, the anticipated divided regions 69A refer to divided regions 69 that are anticipated in advance to be divided regions 69 that might be contacted accompanying a first contact operation, and the non-anticipated divided regions 69B refer to divided regions 69 other than the anticipated divided regions 69A. Note that the anticipated divided regions 69A are determined based on the first contact operation data stored in the default data storage region 54. For example, divided regions 69 enclosed by a frame of an enlarged outline around the route of the first contact operation expressed by the first contact operation data are employed as the anticipated divided regions 69A.

At step 114F, the determination section 14 applies different weighting values to the respective anticipated divided regions 69A and non-anticipated divided regions 69B. The weighting values applied to the anticipated divided regions 69A are larger than the weighting values applied to the non-anticipated divided regions 69B. Moreover, the weighting values applied to the non-anticipated divided regions 69B become smaller the further away the non-anticipated divided regions 69B from the anticipated divided regions 69A.

Figure 11:
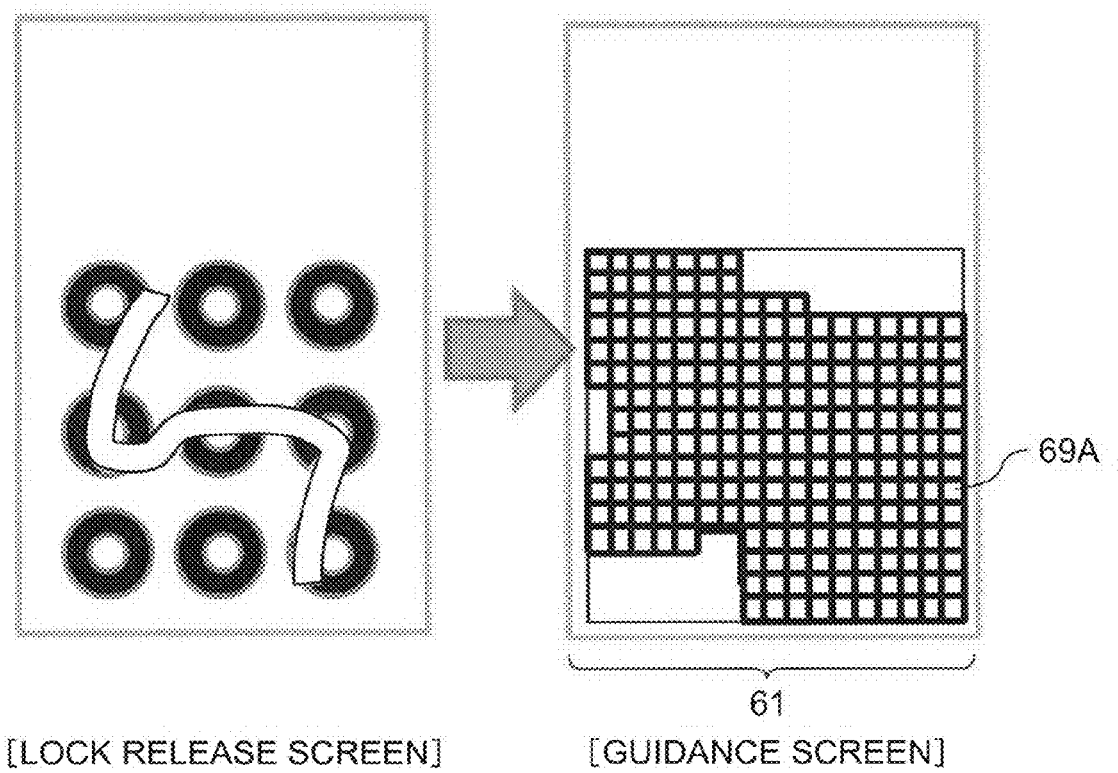
FIG. 11 is a diagram illustrating an example of a state of a guidance screen according to the first exemplary embodiment.

At the next step 114G, the first notification section 20 generates guidance screen data that guides the user of the smartphone 10 regarding the position of the second contact operation based on the weighting values applied to the anticipated divided regions 69A and the non-anticipated divided regions 69B at step 114F. Note that the pattern lock images 59 are not displayed on the guidance screen. Moreover, the anticipated divided regions 69A and the non-anticipated divided regions 69B are displayed so as to be visually distinguishable from each other. For example, as shown in the example illustrated in FIG. 11, outlines of the non-anticipated divided regions 69B are not displayed, whilst outlines of the anticipated divided regions 69A are displayed by a bold line.

At the next step 114H, the third notification section 28 determines whether or not position identification data is stored in the position identification data storage region 52. The position identification data stored in the position identification data storage region 52 refers to position identification data that is stored in the position identification data storage region 52 due to a step 116G during lock release permissibility processing, which is described later, having been performed in the past. Namely, the position identification data is position identification data that enables identification of the position on the surface of the touch panel display 60 of a contact trail formed by a second contact operation that has been performed in the past. When at step 114H position identification data is not stored in the position identification data storage region 52, determination is negative and processing transitions to step 114K. When at step 114H position identification data is stored in the position identification data storage region 52, determination is affirmative and processing transitions to step 114I.

Figure 12:
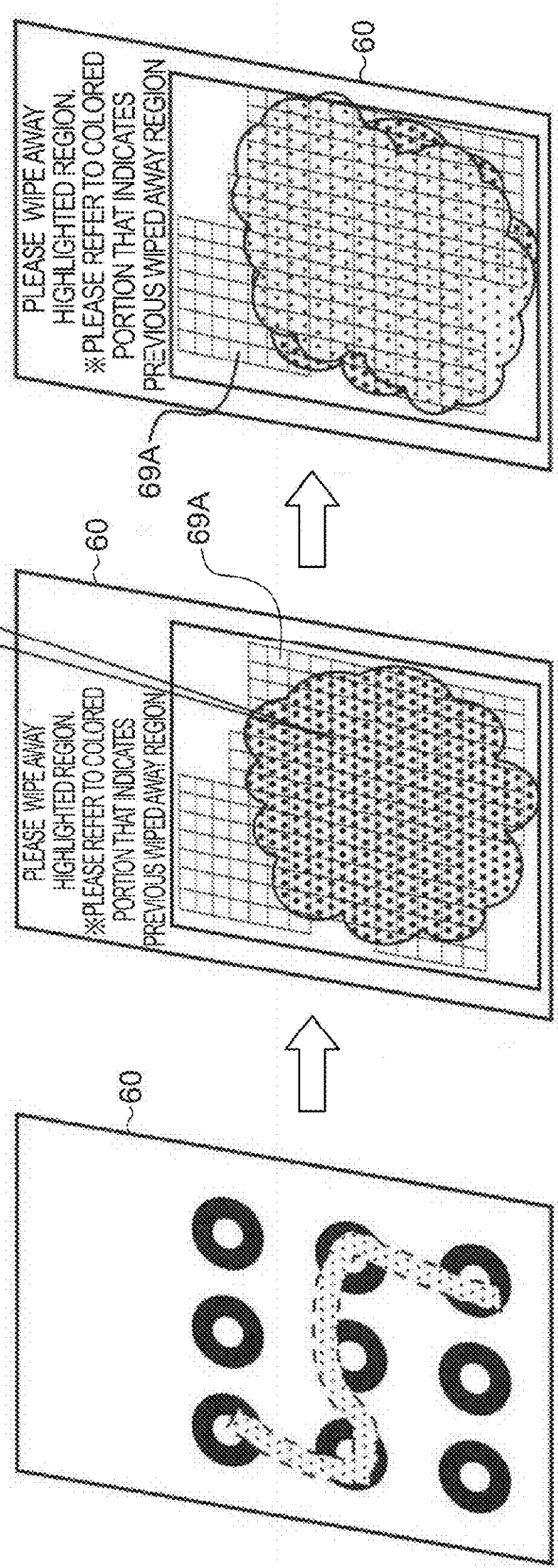
FIG. 12 is a diagram illustrating examples of respective states of a lock release screen, a guidance screen to which a second contact operation has not been performed, and a guidance screen to which a second contact operation has been performed according to the first exemplary embodiment.

At step 114I, the third notification section 28 acquires the position identification data from the position identification data storage region 52, after which processing transitions to step 114J. At step 114J, the third notification section 28 displays on the touch panel display 60 the guidance screen generated at step 114G in a state in which an identified region 60A, an example of which is illustrated in FIG. 12, has been colored with a first identifying color (for example a pale red color). The identified region 60A refers to a region of the guidance screen corresponding to positions of a contact trail formed by a past second contact operation that is identified by the position identification data acquired at step 114I. Moreover, as illustrated in the example in FIG. 12, a message that prompts the user of the smartphone 10 to wipe away a highlighted region indicating the anticipated divided regions 69A, and a message indicating that the colored region is a region that was wiped away on a previous occasion, are displayed at an upper portion of the guidance screen. The present guidance screen display processing is then ended upon performance of the processing of step 114J.

At step 114K, the first notification section 20 displays on the touch panel display 60 the guidance screen (a guidance screen that is not colored with the first identifying color) that was generated at step 114G. The present guidance screen display processing is then ended upon performance of the processing of step 114K.

FIG. 13 illustrates an example of a flow of operation of lock release permissibility processing. In the lock release permissibility processing illustrated in FIG. 13, firstly at step 116A the determination section 14 determines whether or not a contact operation to the first available region 61 has been detected. When at step 116A a contact operation to the first available region 61 has been detected, determination is affirmative and processing transitions to step 116B. When at step 116A a contact operation to the first available region 61 has not been detected, determination is negative and processing transitions to step 116J.

At step 116B, the determination section 14 determines whether or not the region in which the contact operation was detected at step 116A is a region that has not yet been contacted since the start of lock release permissibility processing (an un-contacted region). When at step 116B the region in which the contact operation was detected at step 116A is not an un-contacted region (when it is an already-contacted region), determination is negative and processing transitions to step 116A. When at step 116B the region in which the contact operation was detected at step 116A is an un-contacted region, determination is affirmative and processing transitions to step 116C.

At step 116C, the determination section 14 sets "1" for a variable associated with the position identification data that identifies a region including a detection region at which the contact operation was detected at step 116A (referred to below as a "contacted region" (described later)), after which processing transitions to step 116D. The initial variable setting value is "0", and variables for which "1" has been set are reset to the initial setting value at step 116G, described later. Note that the contacted region mentioned above refers to a rectangular shaped region with one edge of a specific length (for example from 5 mm to 10 mm) that is centered on 2-dimensional coordinates (Xi, Yi) in a case where the 2-dimensional coordinates of the center of the detection region mentioned above are (Xi, Yi), as illustrated in the example of FIG. 14.

Figure 14:
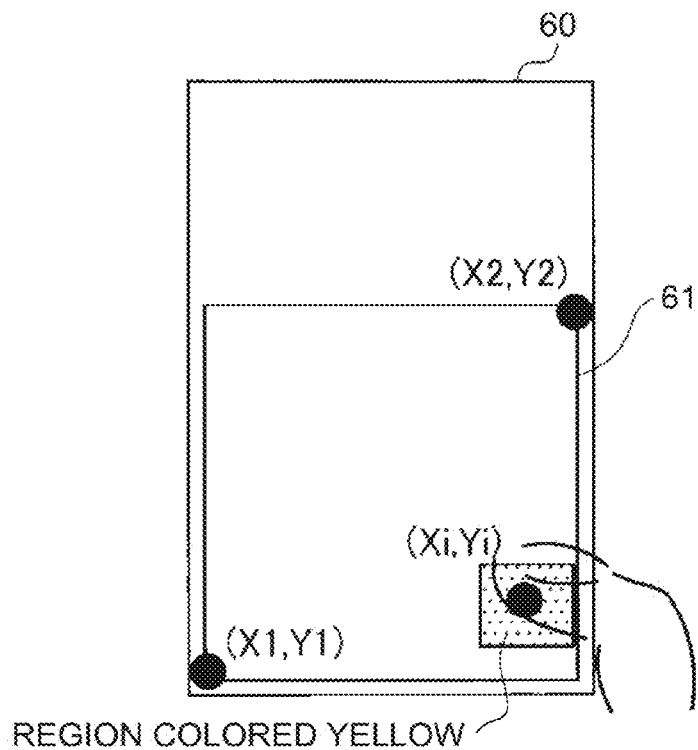
FIG. 14 is a diagram illustrating an example of a display state of a touch panel display in a state when making notification to enable a region that has received contact accompanying a second contact operation to be distinguished from other regions according to the first exemplary embodiment.

At step 116D, the fourth notification section 30 notifies such that the contact region and the other regions are distinguishable from each other by coloring the region where the variable has been set to "1" at step 116C with a second identifying color (for example yellow) as illustrated in the example of FIG. 14.

At step 116E, the determination section 14 sums the weighting values of the divided regions 69 included in overlapping regions between the contact regions for which "1" has been set for the variable at step 116C and a specific region, described later, that includes the second available region 65, after which processing transitions to step 116F. Note that an example is described in which the weighting values are summed, however there is no limitation thereto and the weighting values may be multiplied together.

Figure 15:
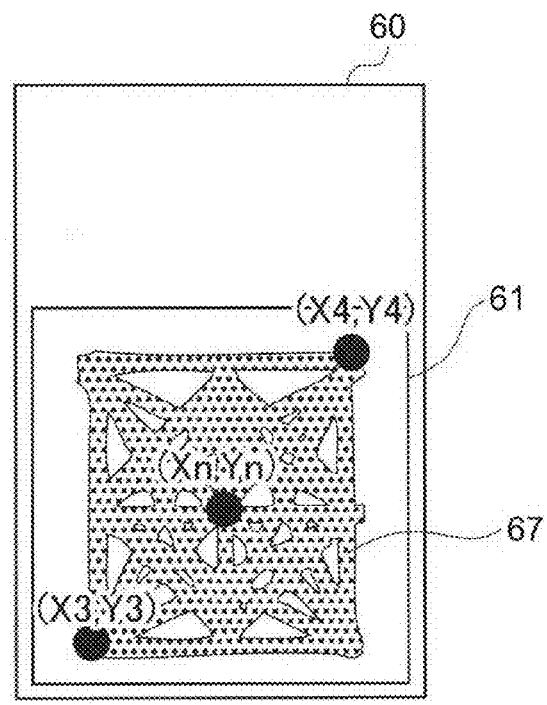
FIG. 15 is a diagram illustrating an example of a state of an anticipated region according to the first exemplary embodiment.

The specific region that includes the second available region 65 means a region of the second available region 65 plus a region outside of the second available region 65 within a specific margin of error. For example as illustrated in FIG. 15, the specific region mentioned above includes a circular shaped region with a radius of a specific length centered on (Xn, Yn) over the anticipated region 67 indicated by the line with a start point and end point of (X3, Y3) and (X4, Y4) respectively. The "specific length" is for example between 5 mm and 10 mm, and refers to a region acquired by widening the anticipated region 67 by a specific factor. Note that an example is described of a circular shaped region, however there is no limitation thereto and configuration may be made with a region of another shape such as a square shaped region or a triangular shaped region.

At step 116F the determination section 14 determines whether or not a wipe away completion condition has been satisfied. The wipe away completion condition is a condition that the total of the weighting values summed at step 116E exceeds a threshold value. The threshold value refers to, for example, the total sum of the weighting values of 70% of the anticipated divided regions 69A out of all of the anticipated divided regions 69A.

When at step 116F the wipe away completion condition has been satisfied, determination is affirmative and processing transitions to step 116G. When at step 116F the wipe away completion condition has not been satisfied, determination is negative and processing transitions to step 116H.

At step 116G, the third notification section 28 overwrite-saves the position identification data for which "1" has been set for the variable at step 116C as actual result region data in the position identification data storage region 52. The third notification section 28 also resets the variables to the initial setting value, and lock release permissibility processing is ended.

At step 116H, the unmet condition presentation section 22 derives an unmet condition. The unmet condition refers to a condition for satisfying the wipe away completion condition that has not been met, and for example refers to a value obtained by converting into a percentage the threshold value reduced by the weighting value total summed at step 116E.

At step 116I, the unmet condition presentation section 22 presents the unmet condition derived at step 116H by displaying the unmet condition on the touch panel display 60, after which processing transitions to step 116A.

Figure 16:
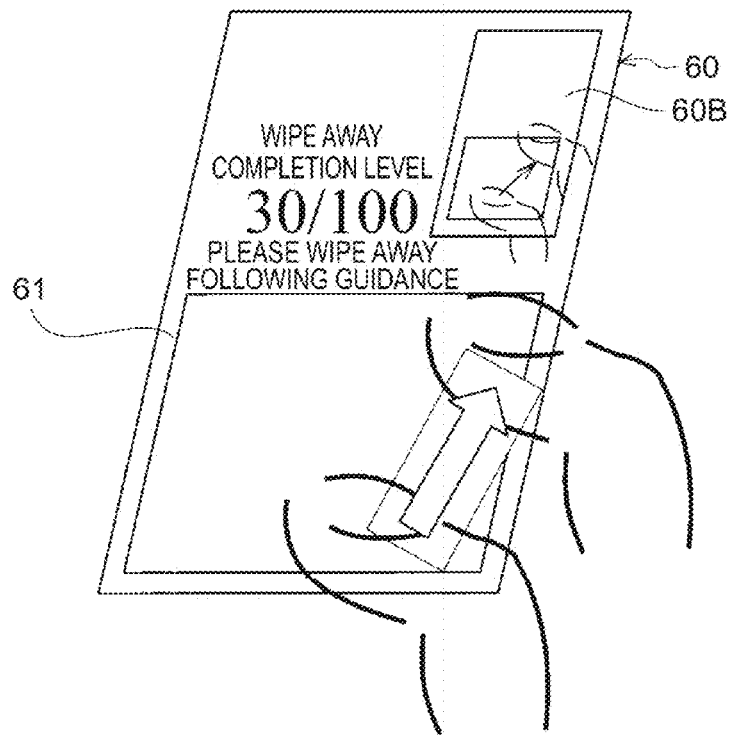
FIG. 16 is a diagram illustrating an example of presentation of an unmet condition according to the first exemplary embodiment.

FIG. 16 illustrates an example of the unmet condition displayed on the touch panel display 60. In the example illustrated in FIG. 16, the value obtained by converting to a percentage the threshold value reduced by the weighting total value summed at step 116E is displayed as a "wipe away completion level". In the example illustrated in FIG. 16, a wipe away completion level of 30/100 is given, indicating that at the current point in time the summed value of the weighting values is about 30% of the threshold value. Moreover, in the example illustrated in FIG. 16 an assist screen 60B that visually assists identification of the wiped away region is displayed on the touch panel display 60 so as not to overlap with the first available region 61. An image is displayed in the assist screen 60B that is recognizable as a position (for example a position on the surface of the touch panel display 60) of the divided regions 69 identified by 2-dimensional coordinates derived at step 228.

At step 116J, the determination section 14 determines whether or not a condition for ending lock release permissibility processing (ending condition) has been satisfied. The "ending condition" may include for example a condition of a specific duration (such as 30 seconds) having elapsed since the initial determination at step 116A, and/or a condition of detection of a push type event (for example an incoming phone call or email). When at step 116J the ending condition has not been satisfied, determination is negative and processing transitions to step 116A. When at step 116J the ending condition has been satisfied, determination is affirmative and processing transitions to step 116K.

At step 116K, error processing is performed, after which the lock release permissibility processing is ended, and the lock release processing illustrated in FIG. 3 is ended. The "error processing" refers to, for example, processing to display on the touch panel display 60 a message to the effect that there is a possibility that the region contacted in the first contact operation could be visually discerned.

Returning to FIG. 3, at step 118 the release section 18 releases the locked state, after which lock release processing is ended.

As has been described above, in the smartphone 10 of the first exemplary embodiment the determination section 14 determines whether or not a contact operation detected by the touch panel display 60 is the first contact operation, and also determines whether or not the second contact operation has been detected. The locked state is released when determined that the second contact operation has been detected. The smartphone 10 of the first exemplary embodiment is thereby able to suppress discernment of the first contact operation by a third party.

Moreover, in the smartphone 10 of the first exemplary embodiment, the second contact operation is determined to have been detected when the summed total of the weighting values respectively applied to the plural divided regions 69 obtained by dividing the first available region 61 exceeds the threshold value. The user of the smartphone 10 can therefore efficiently wipe away evidence of contact that is left on the surface of the touch panel display 60 accompanying the first contact operation.

In the smartphone 10 of the first exemplary embodiment, greater weighting values are employed for the weighting values applied to the anticipated divided regions 69A than the weighting values applied to the non-anticipated divided regions 69B. The smartphone 10 of the first exemplary embodiment is thereby able to reduce the duration until detection of the second contact operation when wiping away is performed efficiently, thus making it difficult for a third party to discern the first contact operation.

In the smartphone 10 of the first exemplary embodiment, the weighting values applied to the non-anticipated divided regions 69B become smaller, the farther the non-anticipated divided regions 69B are away from the anticipated divided regions 69A. The smartphone 10 of the first exemplary embodiment is thereby able to reduce the duration until detection of the second contact operation even further.

In the smartphone 10 of the first exemplary embodiment, notification is made to distinguish the anticipated divided regions 69A that are applied with the largest weighting values from the non-anticipated divided regions 69B. The user of the smartphone 10 can accordingly easily recognize a region of the surface of the touch panel display 60 that should be wiped away.

In the smartphone 10 of the present exemplary embodiment, the second available region 65 is determined using the logical sum of the anticipated region 67 and the actual result region 63. The smartphone 10 of the first exemplary embodiment can accordingly provide the user with an efficient second available region for wiping away the evidence of contact.

In the smartphone 10 of the first exemplary embodiment, the unmet condition is presented tracked against the formation of the contact trail on the surface of the touch panel display 60. The user of the smartphone 10 can accordingly easily recognize the condition to release the locked state that has not been met.

In the smartphone 10 of the first exemplary embodiment, when a contact operation to the surface of the touch panel display 60 has been determined to be the first contact operation, notification is made to distinguish the position of the contact trail identified by the position identification data from the other positions. The user of the smartphone 10 can accordingly easily recognize a region of the surface of the touch panel display 60 that should be wiped away.

In the smartphone 10 of the first exemplary embodiment, notification to distinguish between the position of the contact trail from the other positions while being made tracked against the formation of the contact trail accompanying the contact trail formation on the surface of the touch panel display 60. The user of the smartphone 10 can accordingly easily recognize the position of the contact trail formed by the operation up until the present point in time.

In the smartphone 10 of the first exemplary embodiment, notification is made to distinguish between the plural designated candidate positions out of the respective plural pre-instructed candidate positions that are candidate positions at which the first contact operation might be performed to the surface of the touch panel display 60 and other positions. Determination is made as to whether or not detection has been made of the first contact operation that connects the plural designated candidate positions out of the notified plural candidate positions along the first contact operation path. The smartphone 10 of the first exemplary embodiment can accordingly guide the first contact operation with a simple configuration in comparison to cases in which the present configuration is not provided.

Note that in the first exemplary embodiment, explanation has been given of an example in which the largest weighting values are applied to the anticipated divided regions, however there is no limitation thereto, and for example the weighting values applied to the anticipated divided regions 69A may be made smaller than the weighting values applied to the non-anticipated divided regions 69B. The user can accordingly be guided to wipe away regions other than the evidence of contact that is left on the surface of the touch panel display 60 accompanying the first contact operation. By wiping away regions other than the evidence of contact that is left on the surface of the touch panel display 60 accompanying a first contact operation are wiped away, it becomes more difficult for a third party to discern the first contact operation from the evidence of contact.

Figure 17:
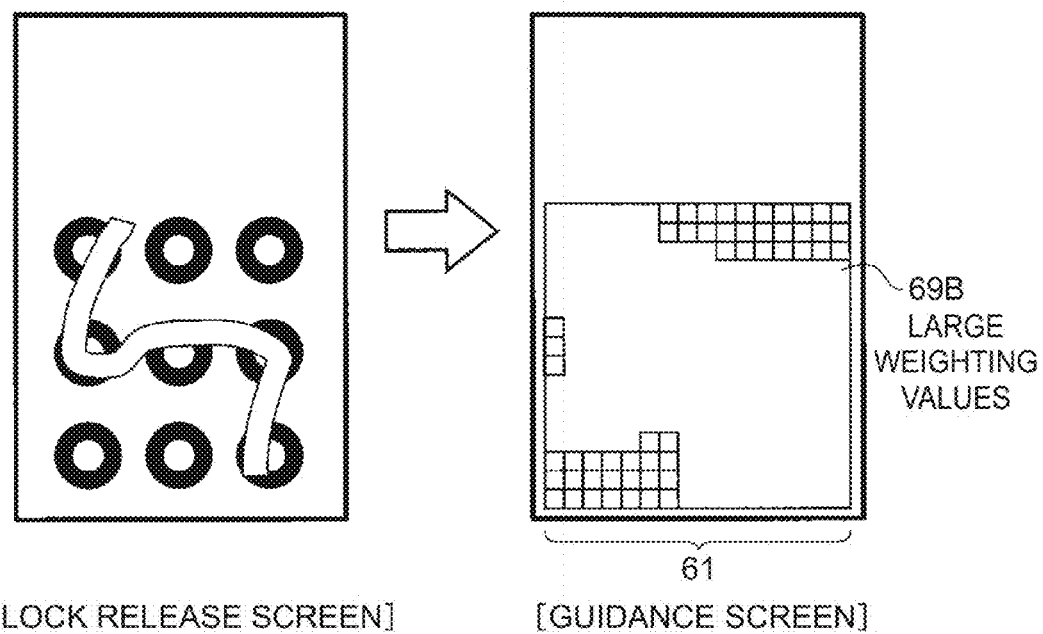
FIG. 17 is an explanatory diagram to assist explanation of a modified example of a weighting value application method according to the first exemplary embodiment.

In cases in which the weighting values applied to the anticipated divided regions 69A are smaller than the weighting values applied to the non-anticipated divided regions 69B, as illustrated in FIG. 17 configuration may be made wherein outlines of the anticipated divided regions 69A are not displayed and outlines of the non-anticipated divided regions 69B are displayed.

Moreover in the first exemplary embodiment an example has been given of a configuration in which the determination section 14 uses the weighting values to determine whether or not the second contact operation has been performed, however the technology disclosed herein is not limited thereto.

For example, the determination section 14 may determine that the second contact operation has been performed when the occupied surface area, in the first available region, of a contact trail formed in the first available region has exceeded a threshold value. Note that in such cases, the threshold value may be a fixed value or may be a variable value. By making determination that the second contact operation has been performed when the occupied surface area of the first available region has exceeded the threshold value, use of the smartphone 10 by a third party may be blocked with a simple configuration in comparison to when the present configuration is not provided.

In the first exemplary embodiment an example has been described in which the pattern lock image data, the anticipated region data and the first contact operation data is stored in the default data storage region 54, however the technology disclosed herein is not limited thereto. For example, the pattern lock image data, the anticipated region data and the first contact operation data may be pre-stored in an external device (such as a server device) that is capable of communication with the smartphone 10. In such a configuration, the smartphone 10 may acquire the pattern lock image data, the anticipated region data and the first contact operation data from the external device during performance of lock release processing.

Second Exemplary Embodiment

The first exemplary embodiment describes an example in which the anticipated divided regions 69A are wiped away with a finger, however in the second exemplary embodiment explanation is given of an embodiment in which discerning of the first contact operation by a third party is suppressed without employing the anticipated divided regions 69A. Note that in the second exemplary embodiment, portions that are similar to portions explained in the first exemplary embodiment are allocated the same reference numerals, and explanation thereof is omitted.

Figure 18:
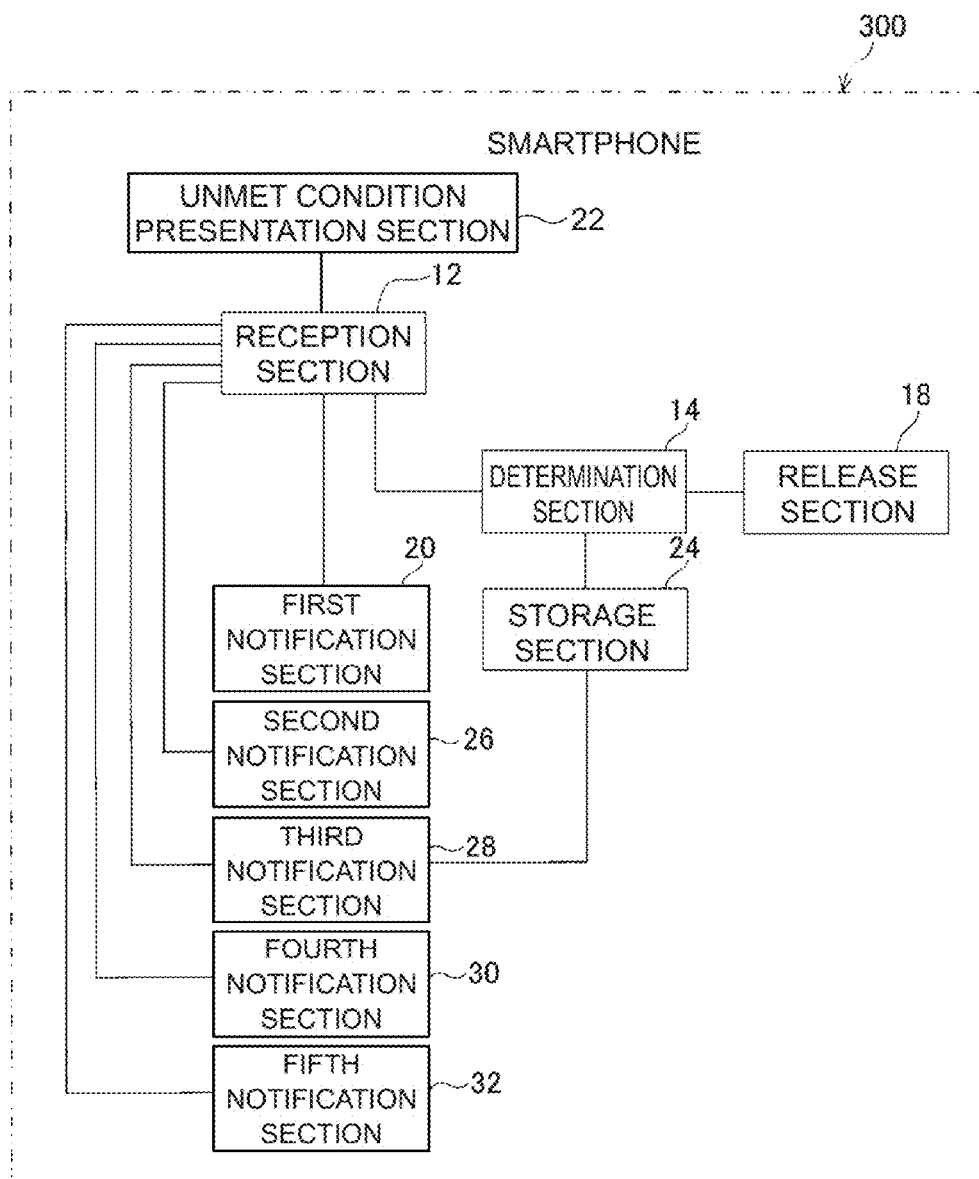
FIG. 18 is a function block diagram illustrating an example of main functions of a smartphone according to the second exemplary embodiment.

FIG. 18 illustrates an example of main functions of a smartphone 300 according to the second exemplary embodiment. The smartphone 300 illustrated in FIG. 18 differs from the smartphone 10 illustrated in FIG. 1 in the point that it further includes a second notification section 26. The second notification section 26 notifies so as to allow predetermined plural positions on the surface of the touch panel display 60 to be distinguished from other positions on the surface of the touch panel display 60. The "predetermined plural positions" refer to, for example, plural positions that guide a contact path for depicting a specific route on the surface of the touch panel display 60. The "specific route" refers to a predetermined route that is different from at least the route formed by the first contact operation. Moreover, in the second exemplary embodiment, plural positions on the specific route are employed as an example of the "predetermined plural positions", specifically positions corresponding to the respective positions of the designated plural pattern lock images 59 out of the plural pattern lock images 59. The "designated plural pattern lock images 59" include pattern lock images 59 corresponding to the positions of regions that are different from the regions that are contacted accompanying the first contact operation.

FIG. 19 illustrates an example of relevant configurations of an electrical system of the smartphone 300. The smartphone 300 illustrated in FIG. 19 differs from the smartphone 10 illustrated in FIG. 2 in the point that it includes a computer 302 in the place of the computer 40. The computer 302 differs from the computer 40 illustrated in FIG. 2 in the point that it includes a storage section 302 in the place of the storage section 46. The storage section 302 differs from the storage section 46 illustrated in FIG. 2 in the point that it is stored with a lock release processing program 306 in the place of the lock release processing program 50, and also in the point that it includes a default data storage region 308 in the place of the default data storage region 54.

The lock release processing program 306 illustrated in FIG. 19 differs from the lock release processing program 50 illustrated in FIG. 2 in the point that it includes a second notification process 50*i*. The CPU 42 operates as the second notification section 26 illustrated in FIG. 18 by executing the second notification process 50*i*.

The default data storage region 308 is pre-stored with pattern lock image data, first contact operation data, second contact operation data, and guidance image data that expresses a guidance image 73, an example of which is illustrated in FIG. 22, as an example of contact position guidance. The "second contact operation data" refers to, for example, 2-dimensional coordinates that enable identification of the position on the surface of the touch panel display 60 of a region that receives contact in a pre-registered second contact operation. Namely, the second contact operation data refers to 2-dimensional coordinates that enable identification of the position of a contact trail (for example a pre-registered contact trail) connecting the predetermined plural positions on the surface of the touch panel display 60 with a second contact operation path (for example a pre-registered path).

Further, guidance image data is pre-stored in a default data storage region 54A. The "guidance image data" refers to image data that expresses a guidance image that enables identification of the predetermined plural positions.

FIG. 20 illustrates an example of a flow of guidance image display processing according to the second exemplary embodiment. The guidance image display processing illustrated in FIG. 20 differs from the guidance image display processing illustrated in FIG. 8 in the point that it includes steps 350, 352 in the place of step 114A and step 114G. The guidance image display processing illustrated in FIG. 20 further differs in the point that it includes a step 354 in the place of step 114J, and includes a step 356 in the place of step 114K.

In the guidance image display processing illustrated in FIG. 20, at step 350 the second notification section 26 acquires the guidance image data from the default data storage region 308. At the next step 352, the second notification section 26 generates a guidance screen according to the second exemplary embodiment based on the guidance image data acquired at step 350. The guidance screen is a screen that notifies so as to enable the predetermined plural positions on the surface of the touch panel display 60 to be distinguished from other positions on the surface of the touch panel display 60, and is for example a screen in which the guidance screen is appended to a lock release screen, as illustrated in FIG. 22.

At step 354, the third notification section 28 displays on the touch panel display 60 the guidance screen generated at step 352, for example in a state in which an identified region 60B, an example of which is illustrated in FIG. 22 (the region enclosed by the broken line), is colored with a first identifying color. The identified region 60B refers to a region corresponding to the position on the guidance screen of a contact trail formed by a second contact operation performed in the past that is identified by the position identification data acquired at step 114I. The guidance image 73 is moreover displayed at an upper portion of the guidance screen (a different region of the touch panel display 60 from the region where the plural pattern lock images are being displayed), as illustrated in the example of FIG. 22.

At step 356, the first notification section 20 displays on the touch panel display 60 the guidance screen generated at step 352 (a guidance screen that is not colored with the first identifying color).

FIG. 21 illustrates an example of a flow of lock release permissibility processing according to the second exemplary embodiment. The lock release permissibility processing illustrated in FIG. 21 differs from the lock release permissibility processing illustrated in FIG. 13 in the point that step 116E has been removed. The lock release permissibility processing also differs in the point that it includes steps 400, 402, 404 in the place of steps 116F, 116H, 116I.

At step 400, the determination section 14 determines whether or not a wipe away completion condition according to the second exemplary embodiment has been satisfied. The wipe away completion condition refers to, for example, a condition that a contact trail identified by the second contact operation data stored in the default data storage region 308 matches contacted regions for which "1" has been set for the variable at step 116C within a specific margin of error When at step 400 the wipe away completion condition has been satisfied, determination is affirmative and processing transitions to step 116G. When at step 400 the wipe away completion condition has not been satisfied, determination is negative and processing transitions to step 402.

At step 402, the unmet condition presentation section 22 derives an unmet condition. The unmet condition refers to a condition for satisfying the wipe away completion condition that has not been met. An example of the unmet condition is a value obtained by converting into a percentage the difference between the contact trail identified by the second contact operation data stored in the default data storage region 308 and the contact regions for which "1" has been set for the variable at step 116C.

At step 404, the unmet condition presentation section 22 presents the unmet condition derived at step 404 by displaying the unmet condition on the touch panel display 60, after which processing transitions to step 116A.

As described above, in the smartphone 300 of the second exemplary embodiment the determination section 14 determines whether or not detection has been made of a second contact operation that forms a contact trail connecting between the predetermined plural positions on the surface of the touch panel display 60 with the second contact operation path. Namely, the determination section 14 determines that a second contact operation has been detected when the user of the smartphone 300 connects between designated plural lock pattern images out of plural lock pattern images with the second contact operation path whilst referring to the guidance screen, of which an example is illustrated in FIG. 22. When the contact trail connecting the second contact operation path is depicted on the surface of the touch panel display 60, a contact trail A of the first contact operation and a contact trail B of the second contact operation are both present on the surface of the touch panel display 60, for example as illustrated in FIG. 22. It is accordingly difficult for a third party to discern the first contact operation from the evidence of contact that is left on the surface of the touch panel display 60 accompanying the first contact operation.

Moreover, in the smartphone 300 of the second exemplary embodiment, the second notification section 26 notifies so as to enable the predetermined plural positions to be distinguished from other positions on the surface of the touch panel display 60. Accordingly, the user of the smartphone 300 can easily recognize the regions on the surface of the touch panel display 60 that should be wiped away.

Moreover, in the second exemplary embodiment, an example has been described of a configuration in which the guidance image 73 is displayed on the touch panel display 60, however the technology disclosed herein is not limited thereto. For example, configuration may be made wherein positions for performing the second contact operation can be identified by changing the display of the designated plural pattern lock images 59 that are being displayed at positions corresponding to the predetermined plural positions, without displaying the guidance image 73. An example of "changing the display of the designated plural pattern lock images 59" would be a display configuration in which the designated plural pattern lock images 59 among the plural pattern lock images 59 are displayed flashing on and off. Alternatively, another example is a display configuration in which at least one out of the color, size and shape of the designated plural pattern lock images 59 out of the plural pattern lock images 59 is varied from that of the remaining pattern lock images 59.

Moreover, in the second exemplary embodiment a wiping away contact operation over the designated plural pattern lock images on the surface of the touch panel display 60 is employed as the second contact operation, however the technology disclosed herein is not limited thereto. For example, a designated contact operation to a different display position from the plural pattern lock images on the surface of the touch panel display 60 (for example a contact operation that does not involve tracing a finger over the pattern lock images) may be employed as the second contact operation. In such cases, for example, a specific graphic is displayed in a display region (for example in a blank display region) that is a different from the display region of the plural pattern lock images of the touch panel display 60, and the user is caused to wipe away the displayed specific graphic using the touch panel display 60.

In the exemplary embodiments described above, examples have been given in which notification by the first notification section 20, the second notification section 26, the third notification section 28, the fourth notification section 30 and the fifth notification section 32 are respectively implemented by visual displays employing the touch panel display 60, however the technology disclosed herein is not limited thereto. For example, notification may be made by audible display performed using a speaker, or by a printed output performed using a printer. Configuration may moreover be made employing a combination of two or more out of a visual display performed using the touch panel display 60, an audible display performed using a speaker, and a printed output performed using a printer.

Moreover, in each of the exemplary embodiments described above, exemplary embodiments have been described in which each of the sections illustrated in FIG. 1 and FIG. 17 (including for example the determination section 14 and the release section 18) are implemented by a software configuration employing the computer 40, however the technology disclosed herein is not limited thereto. For example, configuration may be made wherein at least one out of each of the sections illustrated in FIG. 1 and FIG. 18 is implemented by a hardware configuration. In such cases, for example an Application Specific Integrated Circuit (ASIC) that is an integrated circuit in which plural functions are consolidated into one circuit may be employed, or a programmable logic device may be employed.

Moreover, in the second exemplary embodiment an example is described in which the pattern lock image data, the first contact operation data, the second contact operation data, and the guidance image data are stored in the default data storage region 308, however the technology disclosed herein is not limited thereto. For example, the pattern lock image data, the first contact operation data, the second contact operation data and the guidance image data may be stored in an external device (such as a server device) that is capable of communication with the smartphone 300. In such a configuration, the smartphone 300 may acquire the pattern lock image data, the first contact operation data, the second contact operation data and the guidance image data from the external device when performing lock release processing.

All cited documents, patent applications and technical standards mentioned in the present specification are incorporated by reference in the present specification to the same extent as if the individual cited documents, patent applications and technical standards were specifically and individually incorporated by reference in the present specification.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing device comprising:
    a processor; and
    a memory storing instructions, which when executed by the processor perform a procedure, the procedure including:
        (a) detecting a contact operation to a contacted face and receiving an instruction,
        (b) in a locked state, executing first determination to determine whether or not the contact operation detected at (a) is a pre-registered first contact operation, and executing second determination to determine whether or not a second contact operation to a different region from the region where the first contact operation has been detected has been performed, and
        (c) releasing the locked state when it is determined at (b) that the second contact operation has been detected after the first contact operation having been detected at (a) was determined at (b), wherein:
    weighting values are applied to each of a plurality of divided regions obtained by dividing an available region that is determined in advance to be a region that is possible to receive contact accompanying the first contact operation to the contacted face,
    (b) includes determining that the second contact operation has been detected when a value based on a value of the sum or a value of the product of the weighting values applied to the divided regions traversed by a contact trail of the second contact operation on the contacted face exceeds a threshold value, and
    out of the plurality of divided regions, the weighting values applied to divided regions that are anticipated in advance to be the divided regions that is possible to receive contact accompanying the first contact operation to the contacted face are greater than the weighting values applied to the other divided regions.

2. The data processing device of claim 1, wherein:
    out of the plurality of divided regions, the weighting values applied to the divided regions other than anticipated divided regions that are the divided regions anticipated in advance to be divided regions that is possible to receive contact accompanying the first contact operation to the contacted face are smaller, the farther the divided regions other than the anticipated divided regions are away from the anticipated divided regions.

3. The data processing device of claim 1, wherein the procedure further includes:
    (d) notifying to distinguish between the divided regions applied with weighting values of a specific size or greater and the other divided regions.

4. The data processing device of claim 1, wherein:
    out of the available region, a region that is available for formation of the contact trail is a region corresponding to the logical sum of an anticipated region anticipated in advance to be a region that is possible to receive contact accompanying the first contact operation to the contacted face, and a result region that receives contact accompanying the first contact operation to the contacted face.

5. The data processing device of claim 1, wherein the procedure further includes:
    (d) when the second contact operation has been detected, identifying a condition that is unmet at the current point in time to perform the determining at (b), and presenting the identified condition tracked against the second contact operation.

6. The data processing device of claim 1, wherein the procedure further includes:
    (d) storing in the memory position identification data that identifies a position of the contact trail formed by the second contact operation, and
    (e) in a state in which the position identification data has been stored at (d) in the past in the memory, notifying to distinguish between a position of the contact trail identified by the position identification data stored in the memory and other positions on the contacted face when the contact operation detected at (a) has been determined at (b) to be the first contact operation.

7. The data processing device of claim 1, wherein the procedure further includes:
    (d) notifying to distinguish between a position of the contact trail and other positions on the contacted face, and varying a notification tracked against the formation of the contact trail accompanying the formation of the contact trail by the second contact operation to the contacted face.

8. The data processing device of claim 1, wherein the procedure further includes:
    (d) notifying to distinguish between a plurality of respective pre-instructed candidate positions that are candidate positions on the contacted face to perform the first contact operation, and other positions on the contacted face, and
    wherein (b) includes determining whether or not as the first contact operation a first contact operation has been detected at (a) that connects a designated plurality of candidate positions out of the plurality of candidate positions notified at (d) together with a second specific path.

9. A data processing device comprising:
    a processor; and a memory storing instructions, which when executed by the processor perform a procedure, the procedure including:
(a) detecting a contact operation to a contacted face and receiving an instruction,
(b) in a locked state, executing first determination to determine whether or not the contact operation detected at (a) is a pre-registered first contact operation, and executing second determination to determine whether or not a second contact operation to a different region from the region where the first contact operation has been detected has been performed, and
(c) releasing the locked state when it is determined at (b) that the second contact operation has been detected after the first contact operation having been detected at (a) was determined at (b), wherein:
weighting values are applied to each of a plurality of divided regions obtained by dividing an available region that is determined in advance to be a region that is possible to receive contact accompanying the first contact operation to the contacted face,
(b) includes determining that the second contact operation has been detected when a value based on a value of the sum or a value of the product of the weighting values applied to the divided regions traversed by a contact trail of the second contact operation on the contacted face exceeds a threshold value, and
out of the plurality of divided regions, the weighting values applied to divided regions anticipated in advance to be the divided regions that is possible to receive contact accompanying the first contact operation to the contacted face are smaller than the weighting values applied to the other divided regions.

10. The data processing device of claim 9, wherein:
out of the plurality of divided regions, the weighting values applied to the divided regions other than anticipated divided regions that are the divided regions anticipated in advance to be divided regions that is possible to receive contact accompanying the first contact operation to the contacted face are greater, the farther the divided regions other than the anticipated divided regions are away from the anticipated divided regions.

11. The data processing device of claim 9, wherein the procedure further includes:
(d) notifying to distinguish between the divided regions applied with weighting values of a specific size or smaller and the other divided regions.

12. The data processing device of claim 9, wherein:
out of the available region, a region that is available for formation of the contact trail is a region corresponding to the logical sum of an anticipated region anticipated in advance to be a region that is possible to receive contact accompanying the first contact operation to the contacted face, and a result region that receives contact accompanying the first contact operation to the contacted face.

13. The data processing device of claim 9, wherein the procedure further includes:
(d) when the second contact operation has been detected at (a), identifying a condition that is unmet at the current point in time to perform the determining at (b), and presenting the identified condition tracked against the second contact operation.

14. The data processing device of claim 9, wherein the procedure further includes:
(d) storing in the memory position identification data that identifies a position of the contact trail formed by the second contact operation, and
(e) in a state in which the position identification data has been stored at (d) in the past in the memory, notifying to distinguish between a position of the contact trail identified by the position identification data stored in the memory and other positions on the contacted face when the contact operation detected at (a) has been determined at (b) to be the first contact operation.

15. The data processing device of claim 9, wherein the procedure further includes:
(d) notifying to distinguish between a position of the contact trail and other positions on the contacted face, and varying a notification tracked against the formation of the contact trail accompanying the formation of the contact trail by the second contact operation to the contacted face.

16. The data processing device of claim 9, wherein the procedure further includes:
(d) notifying to distinguish between a plurality of respective pre-instructed candidate positions that are candidate positions on the contacted face to perform the first contact operation, and other positions on the contacted face, and
wherein (b) includes determining whether or not as the first contact operation a first contact operation has been detected at (a) that connects a designated plurality of candidate positions out of the plurality of candidate positions notified at (d) together with a second specific path.

17. A data processing method comprising:
(a) by a processor, detecting a contact operation to a contacted face and receiving an instruction,
(b) by the processor, in a locked state, executing first determination to determine whether or not the contact operation detected at (a) is a pre-registered first contact operation, and executing second determination to determine whether or not a second contact operation to a different region from the region where the first contact operation has been detected has been performed, and
(c) by the processor, releasing the locked state when it is determined that the second contact operation has been detected after the first contact operation having been detected at (a) was determined at (b), wherein:
weighting values are applied to each of a plurality of divided regions obtained by dividing an available region that is determined in advance to be a region that is possible to receive contact accompanying the first contact operation to the contacted face, and
(b) includes determining that the second contact operation has been detected when a value based on a value of the sum or a value of the product of the weighting values applied to the divided regions traversed by a contact trail of the second contact operation on the contacted face exceeds a threshold value, and
out of the plurality of divided regions, the weighting values applied to divided regions that are anticipated in advance to be the divided regions that is possible to receive contact accompanying the first contact operation to the contacted face are greater than the weighting values applied to the other divided regions.

18. The data processing method of claim 17, wherein:
out of the plurality of divided regions, the weighting values applied to the divided regions other than anticipated divided regions that are the divided regions anticipated in advance to be divided regions that is possible to receive contact accompanying the first contact operation to the contacted face are smaller, the farther the divided regions other than the anticipated divided regions are away from the anticipated divided regions.

19. A data processing method comprising:
(a) by a processor, detecting a contact operation to a contacted face and receiving an instruction,
(b) by the processor, in a locked state, executing first determination to determine whether or not the contact operation detected at (a) is a pre-registered first contact operation, and executing second determination to determine whether or not a second contact operation to a different region from the region where the first contact operation has been detected has been performed, and
(c) by the processor, releasing the locked state when it is determined that the second contact operation has been detected after the first contact operation having been detected at (a) was determined at (b), wherein:
weighting values are applied to each of a plurality of divided regions obtained by dividing an available region that is determined in advance to be a region that is possible to receive contact accompanying the first contact operation to the contacted face, and
(b) includes determining that the second contact operation has been detected when a value based on a value of the sum or a value of the product of the weighting values applied to the divided regions traversed by a contact trail of the second contact operation on the contacted face exceeds a threshold value, and
out of the plurality of divided regions, the weighting values applied to divided regions anticipated in advance to be the divided regions that is possible to receive contact accompanying the first contact operation to the contacted face are smaller than the weighting values applied to the other divided regions.

20. A non-transitory computer-readable recording medium having stored therein a program for causing a computer to execute a data processing process, the process comprising:
(a) detecting a contact operation to a contacted face and receiving an instruction,
(b) in a locked state, executing first determination to determine whether or not the contact operation detected at (a) is a pre-registered first contact operation, and executing second determination to determine whether or not a second contact operation to a different region from the region where the first contact operation has been detected has been performed, and
(c) releasing the locked state when it is determined at (b) that the second contact operation has been detected after the first contact operation having been detected at (a) was determined at (b), wherein:
weighting values are applied to each of a plurality of divided regions obtained by dividing an available region that is determined in advance to be a region that is possible to receive contact accompanying the first contact operation to the contacted face, and
(b) includes determining that the second contact operation has been detected when a value based on a value of the sum or a value of the product of the weighting values applied to the divided regions traversed by a contact trail of the second contact operation on the contacted face exceeds a threshold value, and
out of the plurality of divided regions, the weighting values applied to divided regions that are anticipated in advance to be the divided regions that is possible to receive contact accompanying the first contact operation to the contacted face are greater than the weighting values applied to the other divided regions.

21. A non-transitory computer-readable recording medium having stored therein a program for causing a computer to execute a data processing process, the process comprising:
(a) detecting a contact operation to a contacted face and receiving an instruction,
(b) in a locked state, executing first determination to determine whether or not the contact operation detected at (a) is a pre-registered first contact operation, and executing second determination to determine whether or not a second contact operation to a different region from the region where the first contact operation has been detected has been performed, and
(c) releasing the locked state when it is determined at (b) that the second contact operation has been detected after the first contact operation having been detected at (a) was determined at (b), wherein:
weighting values are applied to each of a plurality of divided regions obtained by dividing an available region that is determined in advance to be a region that is possible to receive contact accompanying the first contact operation to the contacted face, and
(b) includes determining that the second contact operation has been detected when a value based on a value of the sum or a value of the product of the weighting values applied to the divided regions traversed by a contact trail of the second contact operation on the contacted face exceeds a threshold value, and
out of the plurality of divided regions, the weighting values applied to divided regions anticipated in advance to be the divided regions that is possible to receive contact accompanying the first contact operation to the contacted face are smaller than the weighting values applied to the other divided regions.

* * * * *